(12) United States Patent
Lee et al.

(10) Patent No.: US 10,264,276 B2
(45) Date of Patent: Apr. 16, 2019

(54) METHOD AND APPARATUS FOR ENCODING MOTION INFORMATION AND METHOD AND APPARATUS FOR DECODING SAME

(75) Inventors: Tammy Lee, Seoul (KR); Jianle Chen, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 848 days.

(21) Appl. No.: 14/126,622

(22) PCT Filed: Jun. 14, 2012

(86) PCT No.: PCT/KR2012/004710
§ 371 (c)(1),
(2), (4) Date: Jan. 27, 2014

(87) PCT Pub. No.: WO2012/173415
PCT Pub. Date: Dec. 20, 2012

(65) Prior Publication Data
US 2014/0140408 A1      May 22, 2014

Related U.S. Application Data

(60) Provisional application No. 61/496,780, filed on Jun. 14, 2011.

(51) Int. Cl.
*H04N 19/52* (2014.01)
*H04N 19/65* (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS 5,668,608 A    9/1997   Lee
6,498,815 B2   12/2002  Kleihorst et al.
(Continued)

FOREIGN PATENT DOCUMENTS

CN    1256049 A    6/2000
CN    1457604 A    11/2003
(Continued)

OTHER PUBLICATIONS

Communication from the Japanese Patent Office dated Dec. 9, 2014, in a counterpart Japanese application No. 2014-515754.
(Continued)

*Primary Examiner* — David N Werner
(74) *Attorney, Agent, or Firm* — Sughrue Mion, PLLC

(57) ABSTRACT

Provided are methods and apparatus for encoding and decoding motion information. The method of encoding motion information includes: obtaining a motion information candidate by using motion information of prediction units that are temporally or spatially related to a current prediction unit; adding, when the number of motion information included in the motion information candidate is smaller than a predetermined number n, alternative motion information to the motion information candidate so that the number of motion information included in the motion information candidate reaches the predetermined number n; determining motion information with respect to the current prediction unit from among the n motion information candidates; and encoding index information indicating the determined motion information as motion information of the current prediction unit.

1 Claim, 27 Drawing Sheets

(51) Int. Cl.
*H04N 19/105* (2014.01)
*H04N 19/139* (2014.01)
*H04N 19/513* (2014.01)
*H04N 19/517* (2014.01)
*H04N 19/176* (2014.01)

(52) U.S. Cl.
CPC ......... *H04N 19/513* (2014.11); *H04N 19/517* (2014.11); *H04N 19/521* (2014.11); *H04N 19/65* (2014.11); *H04N 19/176* (2014.11)

(56) References Cited

U.S. PATENT DOCUMENTS

| | | | |
|---|---|---|---|
| 6,825,885 | B2 | 11/2004 | Bottreau et al. |
| 8,270,486 | B2 | 9/2012 | Song et al. |
| 8,488,671 | B2 | 7/2013 | Etoh et al. |
| 9,083,985 | B2 | 7/2015 | Suzuki et al. |
| 2002/0041699 | A1 | 4/2002 | Kim |
| 2002/0118758 | A1 | 8/2002 | Sekiguchi et al. |
| 2006/0008003 | A1 | 1/2006 | Ji et al. |
| 2006/0012719 | A1 | 1/2006 | Karczewicz et al. |
| 2006/0098886 | A1 | 5/2006 | De Haan |
| 2006/0188024 | A1 | 8/2006 | Suzuki et al. |
| 2006/0222074 | A1 | 10/2006 | Zhang |
| 2009/0304084 | A1 | 12/2009 | Hallapuro et al. |
| 2011/0038414 | A1 | 2/2011 | Song et al. |
| 2011/0170601 | A1 | 7/2011 | Kim et al. |
| 2012/0008676 | A1* | 1/2012 | Lee ............... H04N 19/137 375/240.02 |
| 2012/0140823 | A1 | 6/2012 | Song et al. |
| 2012/0230408 | A1* | 9/2012 | Zhou ............... H04N 19/105 375/240.15 |
| 2012/0300846 | A1 | 11/2012 | Sugio et al. |
| 2013/0010869 | A1 | 1/2013 | Sugio et al. |
| 2015/0117544 | A1 | 4/2015 | Sugio et al. |
| 2015/0139329 | A1 | 5/2015 | Nakamura et al. |
| 2015/0146783 | A1 | 5/2015 | Sugio et al. |
| 2015/0181220 | A1 | 6/2015 | Sugio et al. |
| 2015/0208087 | A1 | 7/2015 | Park et al. |

FOREIGN PATENT DOCUMENTS

| | | |
|---|---|---|
| CN | 1736108 A | 2/2006 |
| CN | 1838775 A | 9/2006 |
| CN | 1885948 A | 12/2006 |
| CN | 101023672 A | 8/2007 |
| CN | 100471280 C | 3/2009 |
| CN | 101860754 A | 10/2010 |
| JP | 2006-31597 A | 2/2006 |
| JP | 2013-145971 A | 7/2013 |
| JP | 5865366 B2 | 2/2016 |
| KR | 10-2007-0055903 A | 5/2007 |
| KR | 10-2010-0001078 A | 1/2010 |
| KR | 10-2011-0018188 A | 2/2011 |
| WO | 2012-128540 A2 | 9/2012 |
| WO | 2012/140821 A1 | 10/2012 |
| WO | 2012-160803 A1 | 11/2012 |
| WO | 2012/164880 A1 | 12/2012 |
| WO | 2012/164906 A1 | 12/2012 |
| WO | 2012/164924 A1 | 12/2012 |
| WO | 2012164908 A1 | 12/2012 |

OTHER PUBLICATIONS

Guillaume Laroche, et al., "Robust solution for the AMVP parsing issue", 96. MPEG Meeting; Mar. 21, 2011-Mar. 25, 2011; Geneva; (Motion Picture Expert Group or ISO/IEC JTC1/SC29/WG11), No. m19740, Mar. 18, 2011 (Mar. 18, 2011), XP030048307, pp. 1-10.
Ken McCann (Samsung/Zetacast), et al., "High Efficiency Video Coding (HEVC) Test Model 2 (HM 2) Encoder Description", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jctvc-site/, No. JCTVC-D502, Apr. 15, 2011 (Apr. 15, 2011), XP030113314, total 28 pages.
Jung J, et al., "Proposition for robust parsing with temporal predictor", 95. MPEG Meeting; Jan. 24, 2011-Jan. 28, 2011; Daegu; (Motion Picture Expert Group or ISO/IEC JTC1/SC29/WG11), No. m18957, Jan. 21, 2011 (Jan. 21, 2011), XP030047526, pp. 1-6.
Joel Jung, et al., "Competition-Based Scheme for Motion Vector Selection and Coding", 29. VCEG Meeting; 77. MPEG Meeting; Jul. 17, 2006-Jul. 17, 2006; Klagenfurt, AT; (Video Coding Experts Group of ITU-T SG.16), No. VCEG-AC06r1, Aug. 2, 2006 (Aug. 2, 2006), XP030003490, total 7 pages.
Minhua Zhou, et al., "A study on HM2.0 bitstream parsing and error resiliency issue", 96. MPEG Meeting; Mar. 21, 2011-Mar. 25, 2011; Geneva; (Motion Picture Expert Group or ISO/IEC JTC1/SC29/WG11), No. m19633, Mar. 19, 2011 (Mar. 19, 2011), XP030048200, pp. 1-8.
Li (USTC) B, et al., "On merge candidate construction", Mar. 11, 2011, No. JCTVC-E146, Mar. 11, 2011 (Mar. 11, 2011), XP030008652, pp. 1-4.
Sugio T, et al., "Parsing Robustness for Merge/AMVP", 97. MPEG Meeting; Jul. 18, 2011-Jul. 22, 2011; Torino; (Motion Picture Expert Group or ISO/IEC JTC1/SC29/WG11), No. m20900, Jun. 6, 2012 (Jun. 6, 2012), XP030049463, pp. 1-33.
Chen J, et al., "MVP index parsing with fixed number of candidates", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/, No. JCTVC-F402, Jul. 2, 2011 (Jul. 2, 2011), XP030009425, pp. 1-14.
Zhou M, et al., "A study on HEVC parsing throughput issue", 97. MPEG Meeting; Jul. 18, 2011-Jul. 22, 2011; Torino; (Motion Picture Expert Group or ISO/IEC JTC1/SC29/WG11), No. m20480, Jul. 6, 2011 (Jul. 6, 2011), XP030049044, pp. 1-22.
Communication from the European Patent Office dated Feb. 4, 2015, in a counterpart European Application No. 12799845.8.
International Search Report (PCT/ISA/210), dated Dec. 6, 2012, issued by the International Searching Authority in counterpart International Patent Application No. PCT/KR2012/004710.
Written Opinion (PCT/ISA/237), dated Dec. 6, 2012, issued by the International Searching Authority in counterpart International Patent Application No. PCT/KR2012/004710.
Communication dated Jan. 15, 2016, issued by the Australian Patent Office in counterpart Australian Application No. 2015200192.
Communication from the Australian Patent Office dated May 26, 2016 in a counterpart Australian Application No. 2015203679.
Communication from the Australian Patent Office dated May 26, 2016 in a counterpart Australian Application No. 2015203680.
Communication from the Australian Patent Office dated May 26, 2016 in a counterpart Australian Application No. 2015203681.
Communication from the Australian Patent Office dated May 26, 2016 in a counterpart Australian Application No. 2015203682.
Communication from the State Intellectual Property Office of P.R. China dated May 4, 2016 in a counterpart Chinese application No. 201280039807.5.
Communication dated Sep. 10, 2015, issued by the Australian Patent Office in counterpart Australian Patent Application No. 2015200192.
Communication dated Sep. 8, 2015, issued by the Japanese Patent Office in counterpart Japanese Patent Application No. 2014-515754.
Lin J. et. al., "Improved Advanced Motion Vector Prediction", Joint Collaborative Team on Video Coding (JCT-VC), 4th Meeting, Jan. 20, 2011-Jan. 28, 2011, Daegu, South Korea, 8 pages total.
Chen, J., et al. "MVP index parsing with fixed No. Of candidates", Joint Collaborative Team on Video Coding (JCT-VC), 6th Meeting, Jul. 14, 2011-Jul. 22, 2011, Torino, Italy, 18 pages total.
Communication dated May 13, 2015, issued by the Canadian Intellectual Property Office in counterpart Canadian Application No. 2841921.
Laroche et al., "Robust solution for the AMVP parsing issue", Joint Collaborative Team on Video Coding (JCT-VC) of ITU-TSG16 WP3 and ISO/IEC JTC1/SC29/WG11, JCTVC-E219, pp. 1-10, Mar. 18, 2011.

(56) References Cited

OTHER PUBLICATIONS

Communication dated Nov. 22, 2016, issue by the Canadian Intellectual Property Office in counterpart Canadian Application No. 2,841,921.
Zhou et al: "A study on HM3.0 parsing throughput issue", Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F068 M20480, pp. 1-22, (22 pages total).
Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, 7th Meeting: Geneva, CH, Nov. 21-30, 2011 Document: JCTVC-G1103_d9 (29 Pages Total).
Jianle Chen and Tammy Lee, "MVP index parsing with fixed number of candidates", Joint Collaborative Team on Video Coding (JCT-VC) of ITU-T SG16 WP3 and ISO/IEC JTC1/SC29/WG11, 6th Meeting: Torino, IT, Jul. 14-22, 2011 Document: JCTVC-F402 (19 Pages Total).
Hiroya Nakamura et al., "Unification of derivation process for merge mode and MVP", Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F419 (12 Pages Total).
Toshiyasu Sugio and Takahiro Nishi, "Parsing Robustness for Merge/AMVP", Joint Collaborative Team on Video Coding (JCT-VC) of ITU-T SG16 WP3 and ISO/IEC JTC1/SC29/WG11, 6th Meeting: Torino, IT, Jul. 14-22, 2011 Document: JCTVC-F470 WG11 No. m20900, (35 Pages Total).
Communication dated Oct. 3, 2017, from the Japanese Patent Office in counterpart application No. 2016-228253.
Office Action dated Dec. 18, 2018 by the State Intellectual Property Office of P.R. China in counterpart Chinese Patent Application No. 201710107687.2.
Office Action dated Jan. 17, 2019 by the State Intellectual Property Office of P.R. China in counterpart Chinese Patent Application No. 201710107265.5.
Office Action dated Jan. 29, 2019 by the Japanese Patent Office in counterpart Japanese Patent No. 2018-029547.

* cited by examiner

CODING UNIT (1010)

FIG. 20A

| AMVP_idX | L0 | Value |
|---|---|---|
| 0 | mvL0_Cand0 | 0 |
| 1 | mvL0_Cand1 | 10 |

FIG. 20B

| AMVP_idX | L1 | Value |
|---|---|---|
| 0 | mvL1_Cand0 | 0 |
| 1 | mvL1_Cand1 | 10 |

FIG. 25

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | - | - |
| 4 | - | - |

2500

⬇

| Merge_idx | L0 | L1 |
|---|---|---|
| 0 | mvL0_A, ref0 | - |
| 1 | | mvL1_B, ref0 |
| 2 | mvL0_A, ref0 | mvL1_B, ref0 |
| 3 | (0,0), ref0 | (0,0), ref0 |
| 4 | (0,0), ref1 | (0,0), ref1 |

2511
2510
2512

METHOD AND APPARATUS FOR ENCODING MOTION INFORMATION AND METHOD AND APPARATUS FOR DECODING SAME

TECHNICAL FIELD

The present invention relates to a method and apparatus for encoding and decoding a video, and more particularly, to a method and apparatus for efficiently encoding and decoding motion information of a current prediction unit.

BACKGROUND ART

Due to the recent increase in high definition video contents, the need for a video codec having a higher coding efficiency than a video codec according to the related art such as MPEG-4 H.264/MPEG-4 advanced video coding (AVC) is growing.

Motion compensation is a technique used in removing temporal redundancy in a video signal. By motion compensation, a residual signal which is a difference between an original signal and a reference signal indicated by a motion vector is transmitted to thereby increase a compression efficiency of video coding. In general, a motion vector and a residual value of each block are transmitted to a decoder's end as a result of encoding of each block obtained by motion compensation. Since motion vectors of the respective blocks occupy a considerable portion of an encoded bitstream, information about the motion vectors allocated to the respective blocks is to be reduced in order to increase a compression efficiency.

To reduce a transmission overhead according to encoding of a motion vector, in MPEG-2 codec according to the related art, a motion vector of a previous block is used as a motion vector predictor of a current block, and in codecs such as MPEG-4 H.264/MPEG-4 AVC, a median of motion vectors of previously encoded blocks that are adjacent to a current block on the left, upper, and above right sides is used as a motion vector predictor.

DISCLOSURE

Technical Problem

The present invention provides a method and apparatus for efficiently encoding motion information of a prediction unit.

Technical Solution

A predetermined, fixed number of motion information candidates are generated by using motion information of prediction units that are temporally or spatially related to a current prediction unit.

Advantageous Effects

According to the embodiments of the present invention, as a fixed number of motion information candidates are used, independent processing may be performed compared to a method in which motion information is determined based on peripheral information or a method in which motion information is separately transmitted. Even if an error is generated, since the number of motion information candidates is fixed, error robustness at a parsing stage increases.

DESCRIPTION OF DRAWINGS

The above and other features and advantages of the present invention will become more apparent by describing in detail exemplary embodiments thereof with reference to the attached drawings in which:

FIGS. 20A and 20B illustrate index information indicating a motion vector predictor of a current prediction unit according to an embodiment of the present invention;

FIGS. 23 through 25 are reference diagrams to explain an operation of adding an alternative merge candidate to a merge candidate, according to an embodiment of the present invention;

BEST MODE

Figure 1:
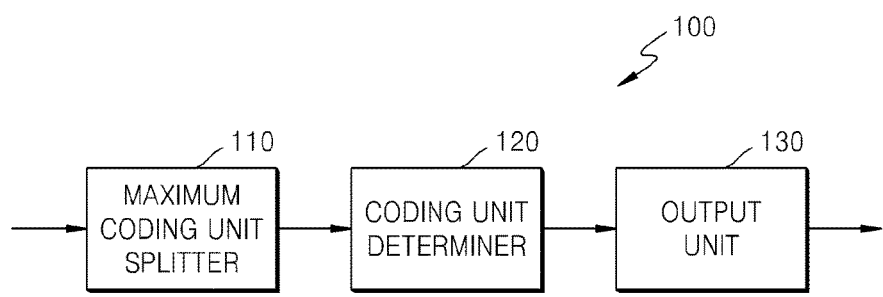
FIG. 1 is a block diagram of a video encoding apparatus according to an embodiment of the present invention.

According to an aspect of the present invention, there is provided a method of encoding motion information, the method comprising: obtaining motion information with respect to a current prediction unit by performing motion prediction on the current prediction unit; obtaining a motion information candidate by using motion information of prediction units that are temporally or spatially related to the current prediction unit; adding, when the number of motion information included in the motion information candidate is smaller than a predetermined number n (n is an integer), alternative motion information to the motion information candidate so that the number of motion information included in the motion information candidate reaches the predetermined number n; determining motion information with respect to the current prediction unit from among the n motion information candidates; and encoding index information indicating the motion information as motion information of the current prediction unit.

According to another aspect of the present invention, there is provided an apparatus for encoding motion information, the apparatus including: an motion information candidate generator for obtaining a motion information candidate by using motion information of prediction units that are temporally or spatially related to a current prediction unit and for adding, when the number of motion information included in the motion information candidate is smaller than a predetermined number n (n is an integer), alternative motion information to the motion information candidate so that the number of motion information included in the motion information candidate reaches the predetermined number n; and a motion information encoder for determining motion information with respect to the current prediction unit from among the n motion information candidates and for encoding index information indicating the motion information as motion information of the current prediction unit.

According to another aspect of the present invention, there is provided a method of decoding motion information, the method comprising: obtaining a motion information candidate by using motion information of prediction units that are temporally related to a current prediction unit and motion information of prediction units that are spatially related to the current prediction unit; adding, when the number of motion information included in the motion information candidate is smaller than a predetermined number n (n is an integer), alternative motion information to the motion information candidate so that the number of motion information included in the motion information candidate reaches the predetermined number n; obtaining an index indicating one of motion information from among the n motion information included in the motion information candidate from a bitstream; and obtaining motion information of the current prediction unit by using motion information indicated by the obtained index.

According to another aspect of the present invention, there is provided an apparatus for decoding motion information, comprising: a motion information candidate generator for obtaining a motion information candidate by using motion information of prediction units that are temporally related to a current prediction unit and motion information of prediction units that are spatially related to the current prediction unit, and adding, when the number of motion information included in the motion information candidate is smaller than a predetermined number n (n is an integer), alternative motion information to the motion information candidate so that the number of motion information included in the motion information candidate reaches the predetermined number n; an entropy decoder for obtaining an index indicating one motion information from among the n motion information included in the motion information candidate from a bitstream; and a motion information decoder for obtaining motion information of the current prediction unit by using motion information indicated by the obtained index.

[Mode For Invention]

Hereinafter, embodiments of the present invention will be described in detail with reference to the attached drawings FIG. 1 is a block diagram of a video encoding apparatus 100 according to an embodiment of the present invention.

The video encoding apparatus 100 includes a maximum coding unit splitter 110, a coding unit determiner 120, and an output unit 130.

The maximum coding unit splitter 110 may split a current picture of an image based on a maximum coding unit, which is a coding unit of a maximum size. If the current picture is larger than a maximum coding unit, image data of the current picture may be split into at least one maximum coding unit. The maximum coding unit according to an embodiment of the present invention may be a data unit having a size of 32×32, 64×64, 128×128, 256×256, etc., wherein a shape of the data unit is a square which has width and length in squares of 2 and is greater than 8. Image data may be output to the coding unit determiner 120 in units of at least one maximum coding unit.

A coding unit according to an embodiment of the present invention may be characterized by a maximum size and a depth. The depth denotes the number of times the coding unit is spatially split from the maximum coding unit, and as the depth deepens, deeper coding units may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, image data of the current picture is split into the maximum coding units according to a maximum size of the coding unit, and each of the maximum coding units may include deeper coding units that are split according to depths. Since the maximum coding unit according to an embodiment of the present invention is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to maximum encoders are output to the output unit 130.

The image data in the maximum coding unit is encoded based on the deeper coding units corresponding to at least one depth equal to or smaller than the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths and as the number of coding units increases. Also, even if coding units correspond to a same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths, and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in a current maximum coding unit. The 'coding units having a tree structure' according to an embodiment of the present invention include coding units corresponding to a depth determined to be the coded depth, from among all deeper coding units included in the maximum coding unit. A coding unit having a coded depth may be hierarchically determined according to depths in the same region of the maximum coding unit, and may be independently determined in different regions. Similarly, a coded depth in a current region may be independently determined from a coded depth in another region.

A maximum depth according to an embodiment of the present invention is an index related to the number of times splitting is performed from a maximum coding unit to a minimum coding unit. A first maximum depth according to an embodiment of the present invention may denote the total number of times splitting is performed from the maximum coding unit to the minimum coding unit. A second maximum depth according to an embodiment of the present invention may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, five depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in at least one maximum coding unit.

The video encoding apparatus 100 may variously select a size or shape of a data unit for encoding the image data. In order to encode the image data, operations such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having the least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth, but also about information related to prediction encoding and transformation. Accordingly, the coding unit determiner 120 not only determines a coded depth having the least encoding error, but also determines a partition type in a prediction unit, a prediction mode according to prediction units, and a size of a transformation unit for transformation.

Coding units according to a tree structure in a maximum coding unit and a method of determining a partition, according to embodiments of the present invention, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bit streams. The encoded image data may be a coding result of residual data of an image. The information about the encoding mode according to the coded depth may include information about the coded depth, information about the partition type in the prediction unit, prediction mode information, and size information of the transformation unit. In particular, as will be described later, when entropy encoding a syntax element indicating a size of a transformation unit, the output unit 130 binarizes a syntax element indicating a size of a transformation but according to bit strings by using the parameter which is gradually updated. The operation of entropy encoding a transformation unit by using the output unit 130 will be described later.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an embodiment of the present invention is a square-shaped data unit obtained by splitting the minimum coding unit constituting the lowermost depth by 4. Alternatively, the minimum unit may be a maximum square-shaped data unit that may be included in all of the coding units, prediction units, partition units, and transformation units included in the maximum coding unit.

For example, the encoding information output through the output unit 130 may be classified into encoding information according to coding units and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bit stream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of four coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, a number of macroblocks per picture excessively increases. Accordingly, a number of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
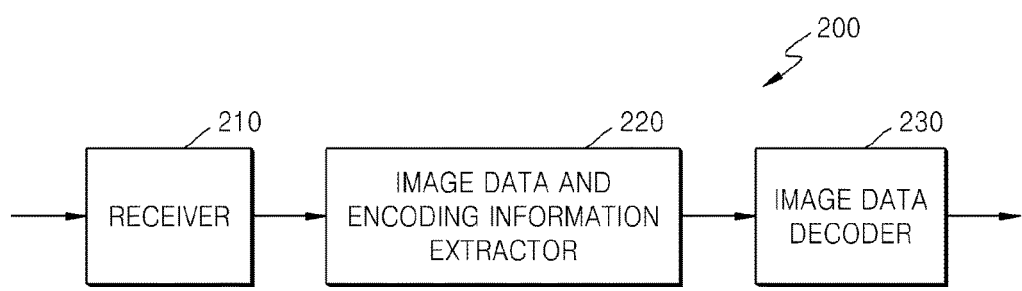
FIG. 2 is a block diagram of a video decoding apparatus according to an embodiment of the present invention.

FIG. 2 is a block diagram of a video decoding apparatus 200 according to an embodiment of the present invention.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives a bit stream of an encoded video to parse a syntax element. The image data and encoding information extractor 220 extracts syntax elements indicating encoded image data based on coding units having a structure by performing entropy decoding of parsed syntax elements, and outputs the extracted syntax elements to the image data decoder 230. That is, the image data and encoding information extractor 220 performs entropy decoding of syntax elements that are received in the form of bit strings of 0 and 1, thereby restoring the syntax elements.

Also, the image data and encoding information extractor 220 extracts information about a coded depth, an encoding mode, color component information, prediction mode information, etc. for the coding units having a tree structure according to each maximum coding unit, from the parsed bitstream. The extracted information about the coded depth and the encoding mode is output to the image data decoder 230. The image data in a bit stream is split into the maximum coding unit so that the image data decoder 230 may decode the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. When information about a coded depth and encoding mode of a corresponding maximum coding unit is assigned to each of predetermined data units, the predetermined data units to which the same information about the coded depth and the encoding mode is assigned may be inferred to be the data units included in the same maximum coding unit.

Also, as will be described later, the image data and encoding information extractor 220 de-binarizes a syntax element indicating a size of a transformation coefficient by using a parameter that is gradually updated. An operation of obtaining size information of a transformation coefficient by using the image data and encoding information extractor 220 by de-binarizing a bit string corresponding to a syntax element indicating a size of a transformation unit will be described in detail later.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode the coding unit of the current depth with respect to the image data of the current maximum coding unit by using the information about the partition type of the prediction unit, the prediction mode, and the size of the transformation unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, encoded image data of the coding units having the tree structure determined to be the optimum coding units in each maximum coding unit may be decoded.

Accordingly, even if image data has a high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an embodiment of the present invention, will now be described with reference to FIGS. 3 through 13.

Figure 3:
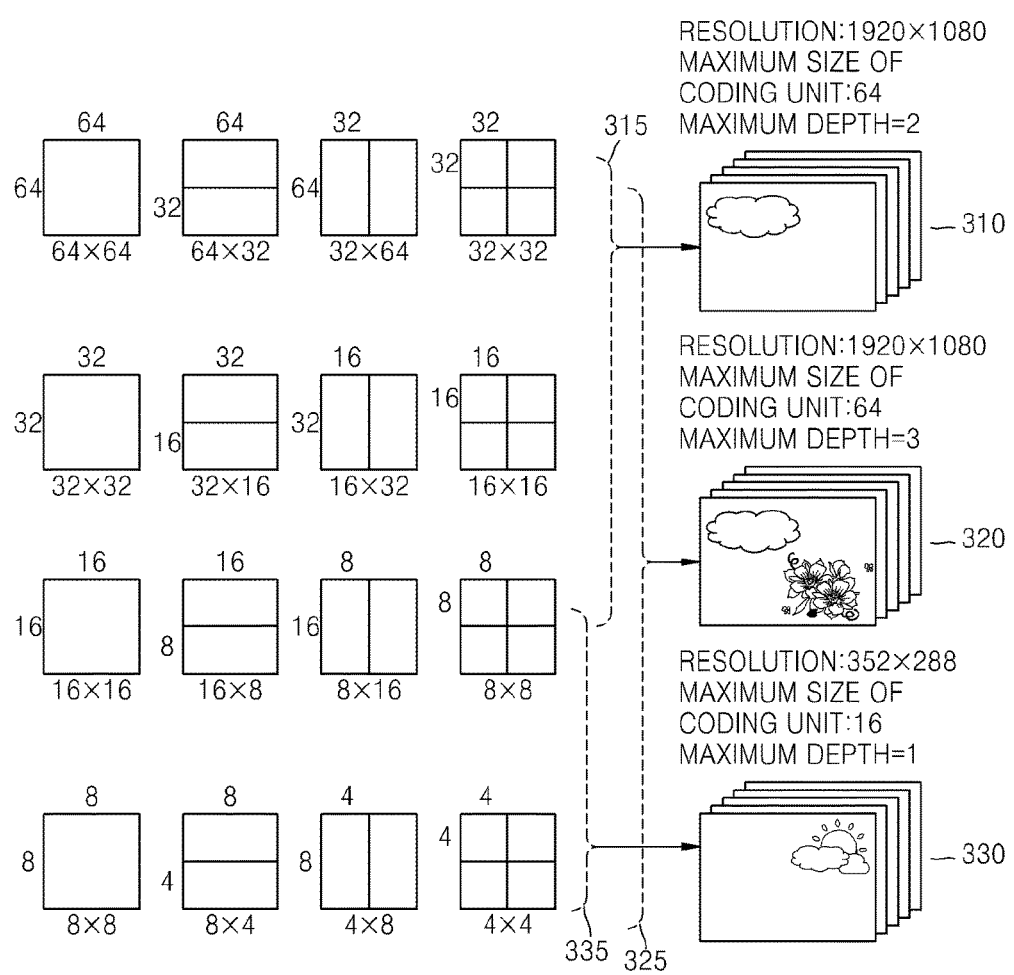
FIG. 3 is a diagram for describing a concept of coding units according to an embodiment of the present invention.

FIG. 3 is a diagram for describing a concept of hierarchical coding units according to an embodiment of the present invention.

A size of a coding unit may be expressed in width×height, and may be 64×64, 32×32, 16×16, and 8×8. A coding unit of 64×64 may be split into partitions of 64×64, 64×32, 32×64, or 32×32; and a coding unit of 32×32 may be split into partitions of 32×32, 32×16, 16×32, or 16×16; a coding unit of 16×16 may be split into partitions of 16×16, 16×8, 8×16, or 8×8; and a coding unit of 8×8 may be split into partitions of 8×8, 8×4, 4×8, or 4×4.

Regarding video data 310, a resolution of 1920×1080, a maximum size of a coding unit of 64, and a maximum depth of 2 are set. Regarding video data 320, a resolution of 1920×1080, a maximum size of a coding unit of 64, and a maximum depth of 3 are set. Regarding video data 330, a resolution of 352×288, a maximum size of a coding unit of 16, and a maximum depth of 1 are set. The maximum depth shown in FIG. 3 denotes a total number of splits from a maximum coding unit to a minimum coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
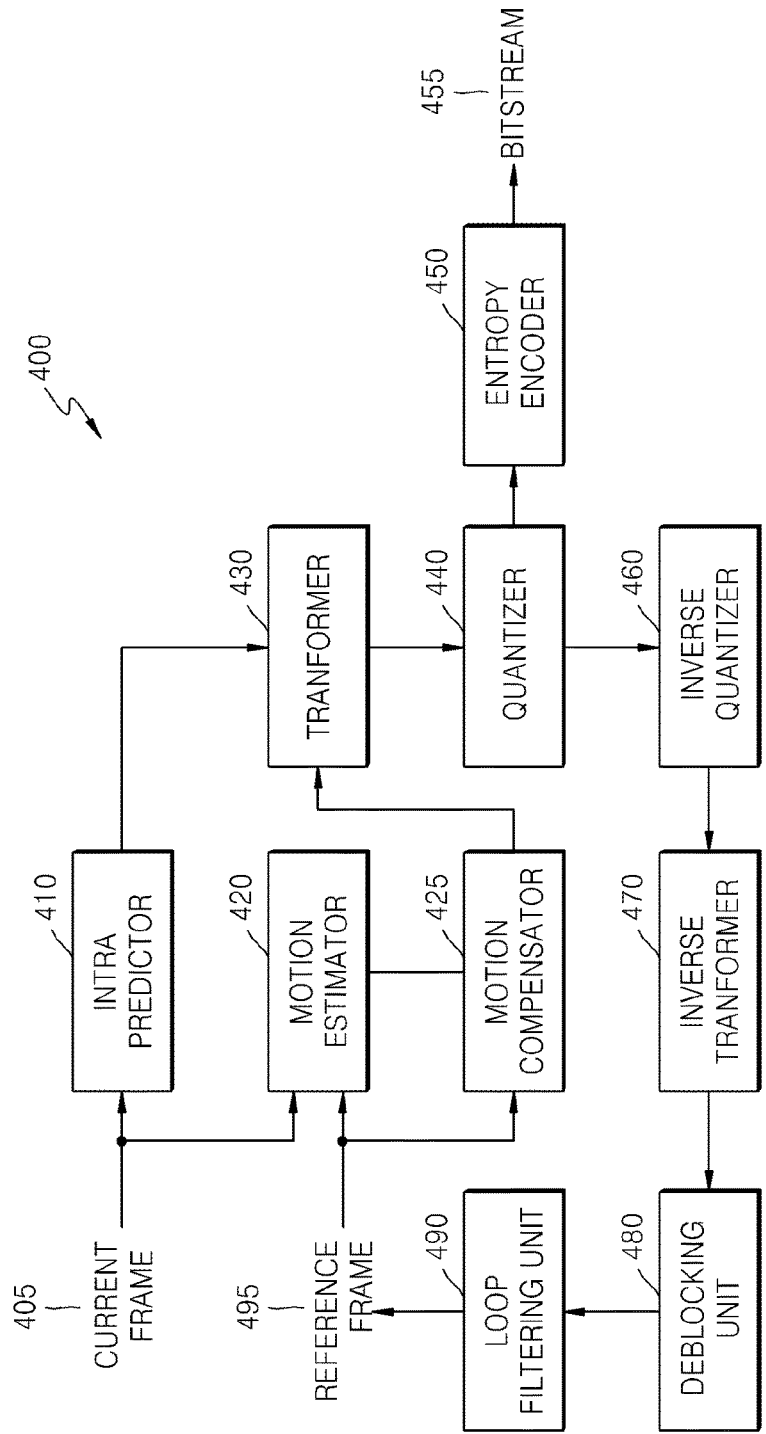
FIG. 4 is a block diagram of a video encoder based on coding units having a hierarchical structure, according to an embodiment of the present invention.

FIG. 4 is a block diagram of a video encoder 400 based on coding units, according to an embodiment of the present invention.

The video encoder 400 includes operations performed in the coding unit determiner 120 of the video encoding apparatus 100 to encode image data. That is, an intra predictor 410 performs intra prediction on coding units in an intra mode, with respect to a current frame 405, and a motion estimator 420 and a motion compensator 425 respectively perform inter estimation and motion compensation on coding units in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the video encoder 400 to be applied in the video encoding apparatus 100, all elements of the video encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, have to perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
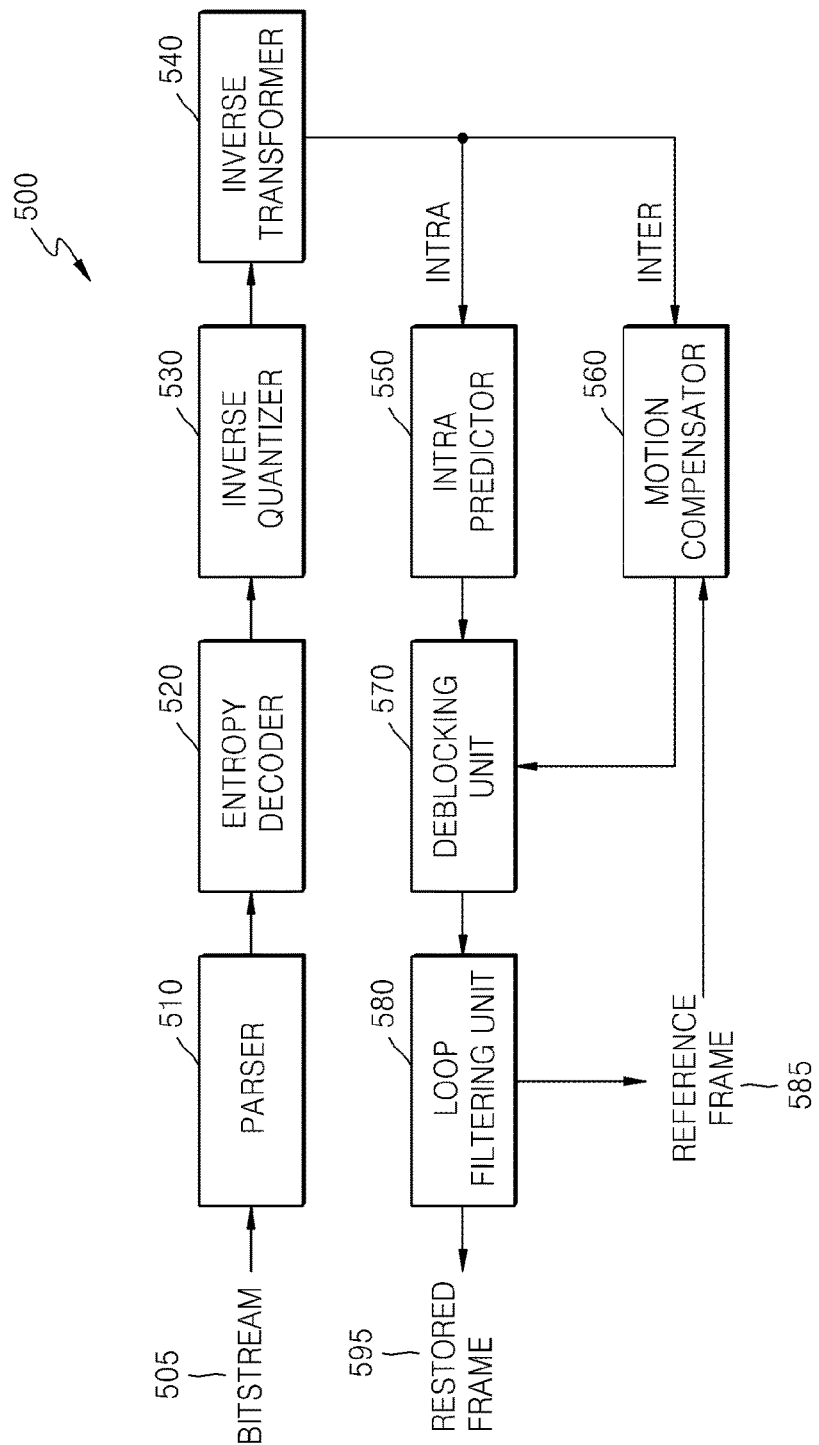
FIG. 5 is a block diagram of a video decoder based on coding units having a hierarchical structure, according to an embodiment of the present invention.

FIG. 5 is a block diagram of a video decoder 500 based on coding units, according to an embodiment of the present invention.

A parser 510 parses encoded image data to be decoded and information about encoding required for decoding, from a bitstream 505. The encoded image data passes through the decoder 520 and the inverse quantizer 530 to be output as inversely quantized data. An inverse transformer 540 restores the inversely quantized data to image data in a spatial domain. An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which has passed through the intra predictor 550 and the motion compensator 560, may be output as a restored frame 595 after being post-processed through a deblocking unit 570 and a loop filtering unit 580. Also, the image data, which is post-processed through the deblocking unit 570 and the loop filtering unit 580, may be output as the reference frame 585.

In order for the video decoder 500 to be applied in the video decoding apparatus 200, all elements of the video decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

The intra predictor 550 and the motion compensator 560 determine a partition and a prediction mode for each coding unit having a tree structure, and the inverse transformer 540 has to determine a size of a transformation unit for each coding unit.

Figure 6:
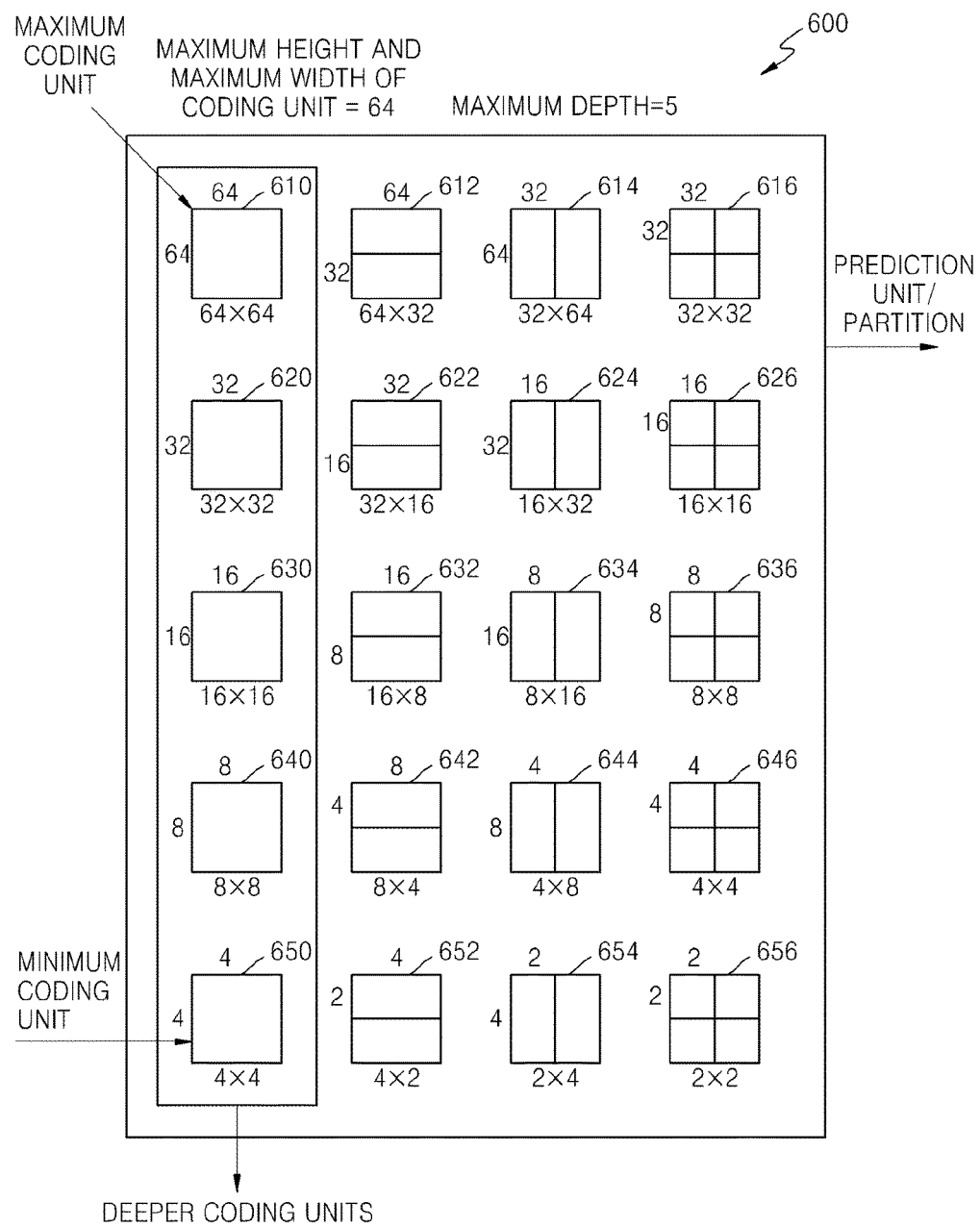
FIG. 6 is a diagram illustrating deeper coding units according to depths, and partitions, according to an embodiment of the present invention.

FIG. 6 is a diagram illustrating deeper coding units according to depths, and partitions, according to an embodiment of the present invention.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to an embodiment of the present invention, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoder 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the maximum coding unit 610 may be selected as the coded depth and a partition type of the maximum coding unit 610.

Figure 7:
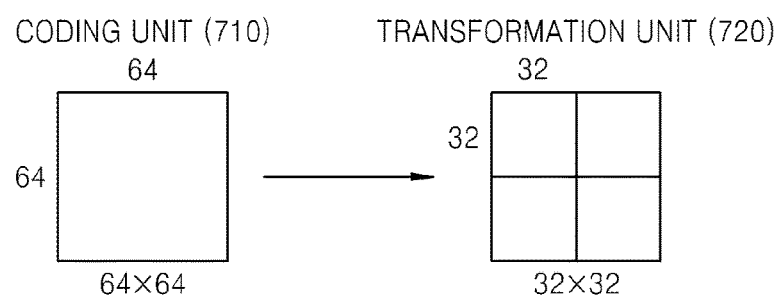
FIG. 7 is a diagram for describing a relationship between a coding unit and transformation units, according to an embodiment of the present invention.

FIG. 7 is a diagram for describing a relationship between a coding unit 710 and transformation units 720, according to an embodiment of the present invention.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
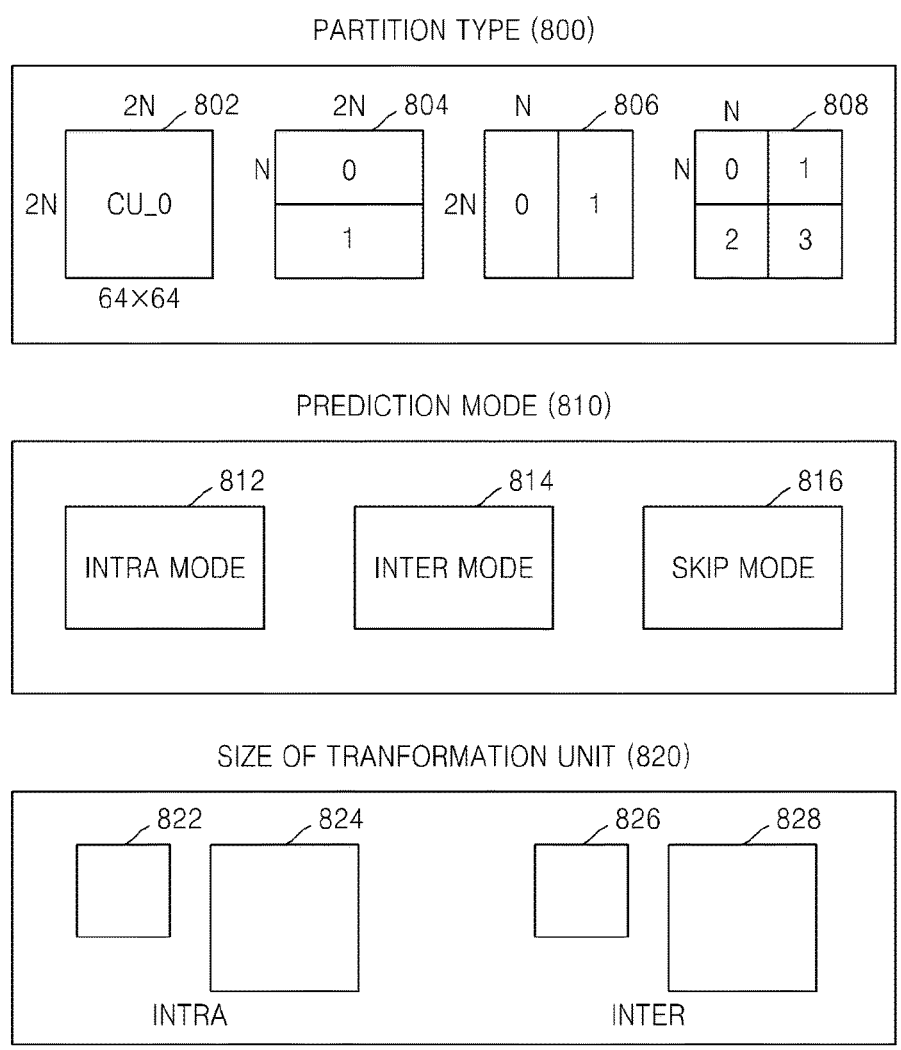
FIG. 8 is a diagram for describing encoding information of coding units corresponding to a coded depth, according to an embodiment of the present invention.

FIG. 8 is a diagram for describing encoding information of coding units corresponding to a coded depth, according to an embodiment of the present invention.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 802 having a size of 2N×2N, the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding data extracting unit 210 of the video decoding apparatus 200 may extract and use the information 800 information about coding units, the information 810 about a prediction mode, and the information 820 about a size of a transformation unit, for decoding, according to each deeper coding unit.

Figure 9:
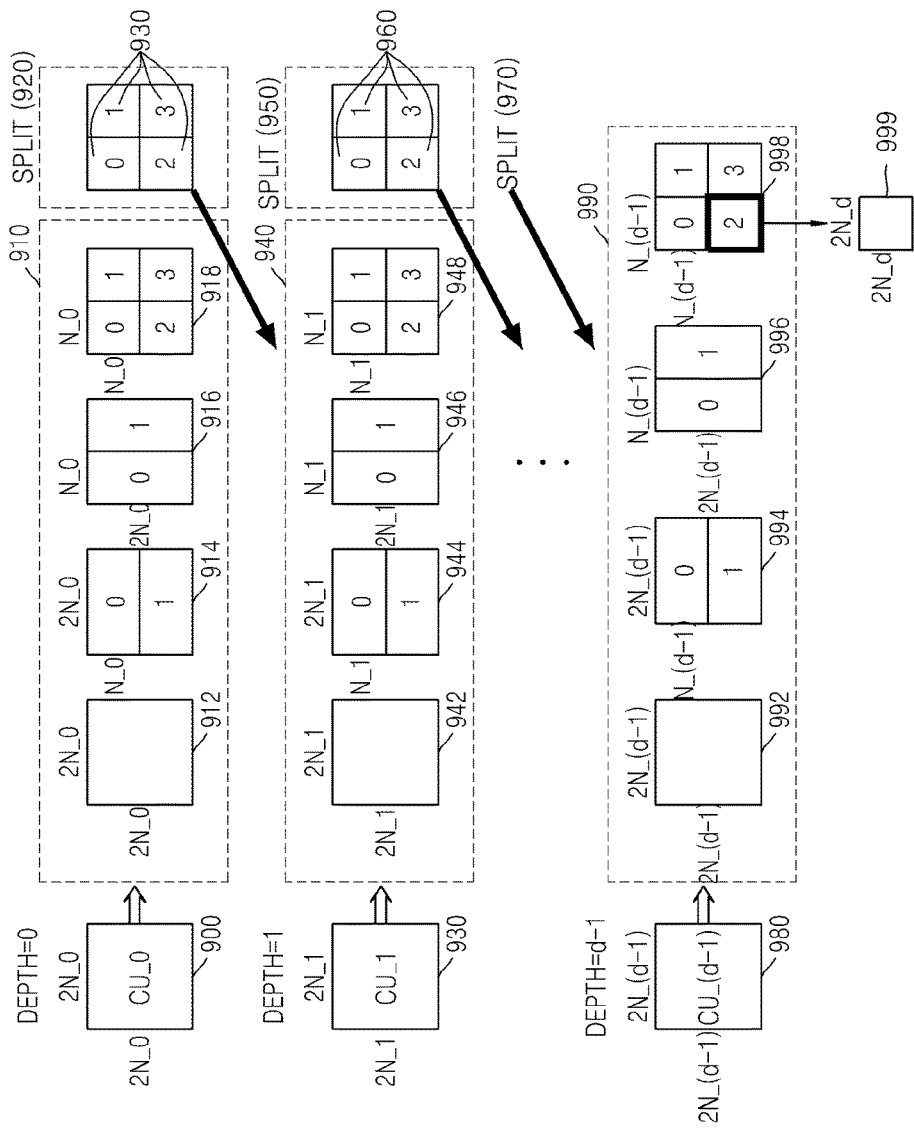
FIG. 9 is a diagram of deeper coding units according to depths, according to an embodiment of the present invention.

FIG. 9 is a diagram of deeper coding units according to depths, according to an embodiment of the present invention.

Split information may be used to indicate a change of a depth. The spilt information indicates whether a coding unit of a current depth is split into coding units of a lower depth.

A prediction unit 910 for prediction encoding of a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is the smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on partition type coding units having a depth of 2 and a size of N_0×N_0 to search for a minimum encoding error.

A prediction unit 940 for prediction encoding of the (partition type) coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split to a lower depth, and a coded depth for the coding units constituting the current maximum coding unit 900 is determined to be d−1 and a partition type of the current maximum coding unit 900 may be determined to be N_(d−1)×N_(d−1). Also, since the maximum depth is d, split information for the minimum coding unit 952 is not set.

A data unit 999 may be a 'minimum unit' for the current maximum coding unit. A minimum unit according to an embodiment of the present invention may be a rectangular data unit obtained by splitting the minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the coding unit 912. The video decoding apparatus 200 may determine a depth, in which split information is 0, as a coded depth by using split information according to depths, and use information about an encoding mode of the corresponding depth for decoding.

Figure 10:
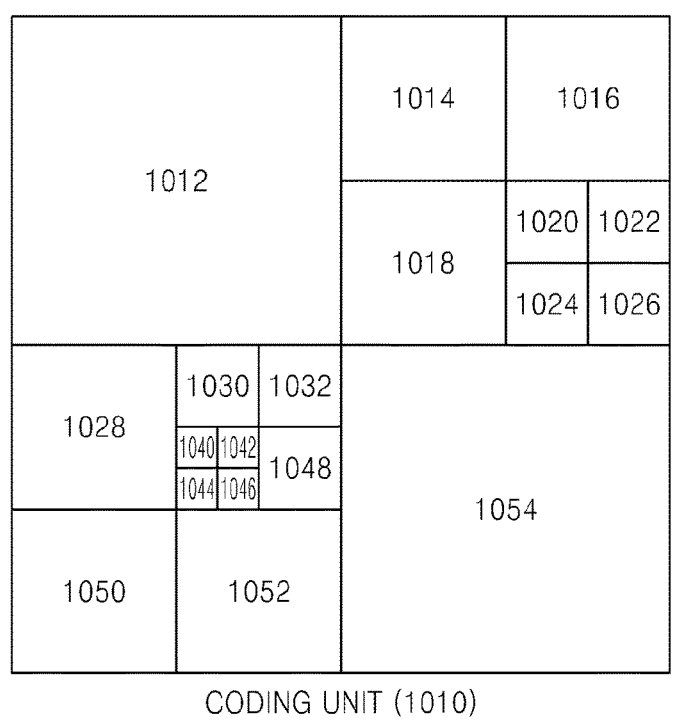
FIGS. 10 through 12 are diagrams for describing a relationship between coding units, prediction units, and frequency transformation units, according to an embodiment of the present invention.
Figure 11:
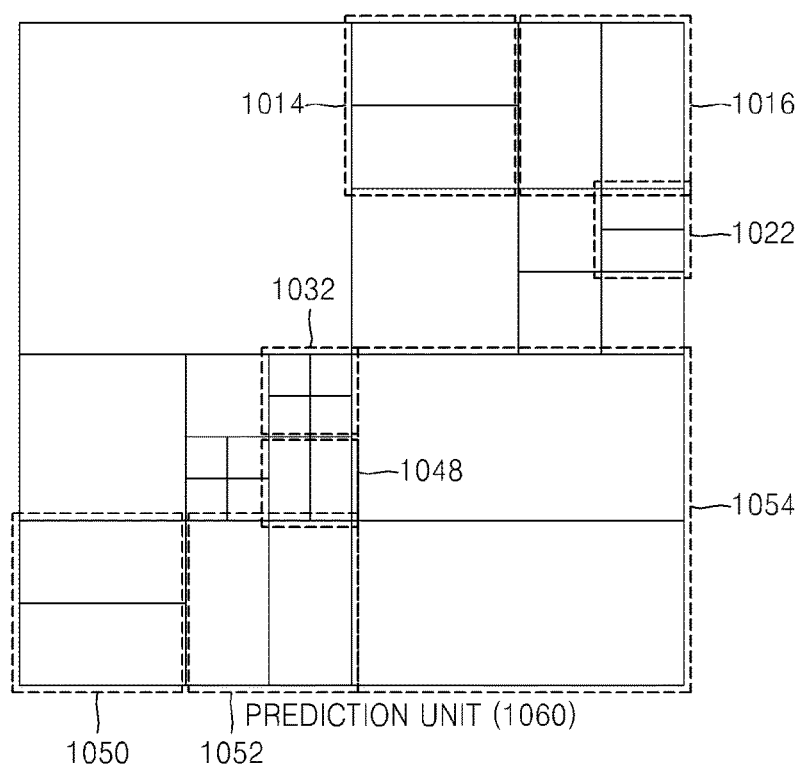
Figure 12:
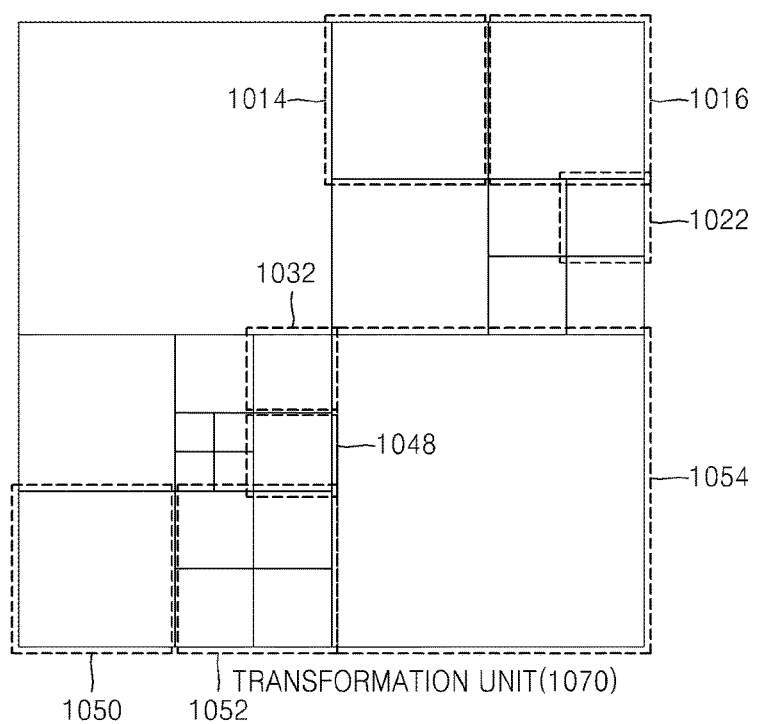

FIGS. 10 through 12 are diagrams for describing a relationship between coding units 1010, prediction units 1060, and transformation units 1070 according to an embodiment of the present invention.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1070 are different from those in the prediction units 1060 in terms of sizes and shapes. In other words, the video encoding apparatus 100 and the video decoding apparatus 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit.

Table 1 shows the encoding information that may be set by the video encoding apparatus 100 and the video decoding apparatus 200.

the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:n and n:1 (where n is an integer greater than 1), and the asymmetrical partition types having the sizes of nL×2N and nR×2N may be respectively obtained by splitting the width of the prediction unit in 1:n and n:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit

TABLE 1

Split Information 0
(Encoding on Coding Unit having Size of
2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2N × 2N) | 2N × nU 2N × nD nL × 2N nR × 2N | 2N × nU 2N × nD nL × 2N nR × 2N | 2N × 2N | N × N (Symmetrical Partition Type) N/2 × N/2 (Asymmetrical Partition Type) | Repeatedly Encode Coding Units Having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, a prediction mode, and a size of a transformation unit may be defined for corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
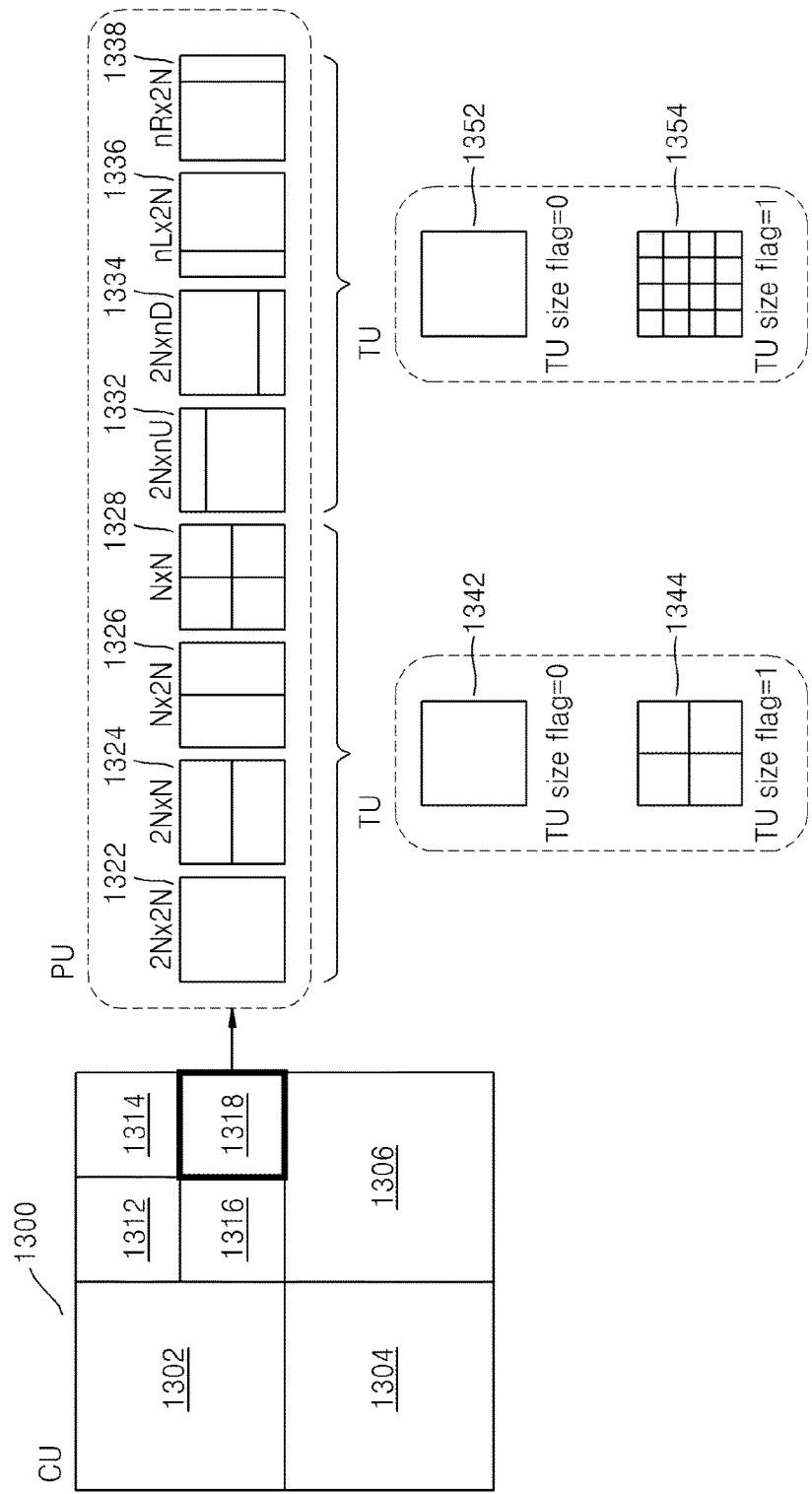
FIG. 13 is a diagram for describing a relationship between a coding unit, a prediction unit, and a transformation unit, according to encoding mode information of Table 1.

FIG. 13 is a diagram for describing a relationship between a coding unit, a prediction unit, and a transformation unit according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Hereinafter, motion prediction and compensation performed in the motion predictor 420 and the motion compensator 425 of the image encoding apparatus 100 of FIG. 4 and the motion compensation unit 550 of the image decoding apparatus 200 of FIG. 5 and encoding and decoding of motion information performed in the entropy encoder 450 of FIG. 4 and the entropy decoder 520 of FIG. 5 will be described in detail. As described above with reference to FIGS. 1 through 13, a prediction unit refers to a prediction unit for prediction encoding of a coding unit; hereinafter, a prediction unit may refer to a prediction unit itself or a partition obtained by splitting a prediction unit.

As described above, prediction units are encoded in various prediction modes such as an intra prediction mode, an inter prediction mode, and a skip mode.

In an inter prediction mode, a current prediction unit is predicted by unidirectional prediction or bidirectional prediction. In detail, a prediction unit included in a P slice is predicted by unidirectional prediction where only one of a reference picture (L0 picture) included in a reference picture list (list 0) and a reference picture (L1 picture) included in a reference picture list (list 1) included in a P slice is used. A prediction method using a reference picture (L0 picture) included in a reference picture list (list 0) is referred to as "L0 prediction," and a prediction method using a reference picture (L1 picture) included in a reference picture list (list 1) is referred to as "L1 prediction." In a reference picture list (List 0), a reference picture index is allocated in an order from a most recent past picture to a previous picture thereto, and then, a reference picture index is allocated in an order from a most nearest future picture to a next picture thereto.

On the other hand, in a reference picture list (List 1), opposite to the reference picture list (List 0), a reference picture index is allocated in an order from a most nearest future picture to a next picture thereto, and then, a reference picture index is allocated in an order from a most recent past picture to a previous picture thereto.

A prediction unit included in a B slice is predicted by unidirectional prediction or bidirectional prediction where an average of a reference picture (L0 picture) included in a reference picture list (list 0) and a reference picture (L1 picture) included in a reference picture list (list 1) are used. In a bidirectional prediction mode performed in the motion predictor 420, any two reference pictures may be used without being limited to previous and subsequent reference pictures to a current picture, and the bidirectional prediction mode may also be referred to as a bipredictive mode.

Costs obtained by encoding prediction values obtained according to each prediction mode may be compared, and a prediction mode with a smallest cost may be determined as a final prediction mode. When comparing the costs, a final prediction mode to be applied to a current prediction unit may be determined based on rate distortion.

In order to generate a prediction value of a prediction unit that is inter predicted at a decoder's end, motion information such as reference picture information indicating which picture is being referred to for each inter predicted prediction unit, motion vector information, and a prediction direction are to be transmitted.

According to embodiments of the present invention, motion information may be encoded using: 1) a first motion information encoding mode (hereinafter referred to as an 'advanced motion vector prediction (AMVP)' mode) in which a motion vector predictor index of a prediction unit, a difference between a prediction mode vector and an original motion vector, reference picture information, and prediction direction information are respectively encoded and transmitted; and 2) a second motion information encoding mode (hereinafter referred to as a 'merge mode') which is a merge mode in which motion information of peripheral prediction units is used as motion information of a current prediction unit, and in which one of a flag (Merge flag) indicating whether a mode corresponds to a merge mode and an index (Merge index) indicating one of peripheral prediction units that are to bring motion information is encoded as motion information of a prediction unit. In regard to selecting a mode for encoding motion information of a prediction unit from among an AMVP mode and a merge mode, a mode with a smaller cost may be selected by comparing RD costs generated according to each mode.

At an encoder's side, when encoding motion information of a current prediction unit in an AMVP mode, a flag (Merge flag) indicating whether a mode applied to the current prediction unit is a merge mode is set as 0, and a motion vector predictor index of a prediction unit, a difference between a motion vector predictor and an original motion vector, reference picture information, and prediction direction information are encoded and transmitted to the decoder's side. At the decoder's end, if the flag (Merge flag) indicating whether a mode applied to the current prediction unit is the merge mode is set as 0, it is determined that motion information of a current prediction unit is encoded in an AMVP mode, and a motion vector predictor index of a prediction unit, a difference between a motion vector predictor and an original motion vector, reference picture information, and prediction direction information are obtained from a bitstream.

Also, at the encoder's side, when encoding motion information of a current prediction unit in a merge mode, a flag (Merge flag) indicating whether a mode applied to the current prediction unit is a merge mode is set as 1, and the flag (Merge flag) indicating whether a mode applied to the current prediction unit is a merge mode and index (Merge index) indicating one of merge prediction candidates that are to bring motion information are transmitted to the decoder's side. At the decoder's side, if the flag (Merge flag) indicating whether a mode applied to the current prediction unit is a merge mode is set as 1, it is determined that motion information of a current prediction unit is determined as encoded in a merge mode, and an index (Merge index) indicating one of merge candidates that are to bring motion information is obtained from a bitstream, and motion information of a merge candidate that is determined using the Merge index, that is, motion vectors of peripheral units, reference picture information, and prediction direction information are used as motion information of a current prediction unit without any change.

According to the method and apparatus for encoding and decoding motion information of the embodiments of the present invention, motion information candidates of a current prediction unit are generated using default motion information obtained using motion information of prediction units that are temporally or spatially related to the current prediction unit, and if the default motion information is less than a preset predetermined number n (n is an integer), the default motion information is modified or preset motion information is added to motion information candidates so as to generate n motion information, and encoding or decoding is performed using an index indicating motion information applied to the current prediction unit is encoded or decoded as motion information of the current prediction unit.

Although description focuses on encoding of motion vector information from among motion information in this specification, the embodiments of the present invention are not limited thereto and may also be applied to encoding of other type of motion information such as reference picture information or prediction direction information other than motion vector information.

Hereinafter, a method and apparatus for encoding motion information of a prediction unit and a method and apparatus for decoding motion information of a prediction unit, according to embodiments of the present invention, will be described in detail.

I. Encoding of Motion Information According to an AMVP Mode

Figure 14A:
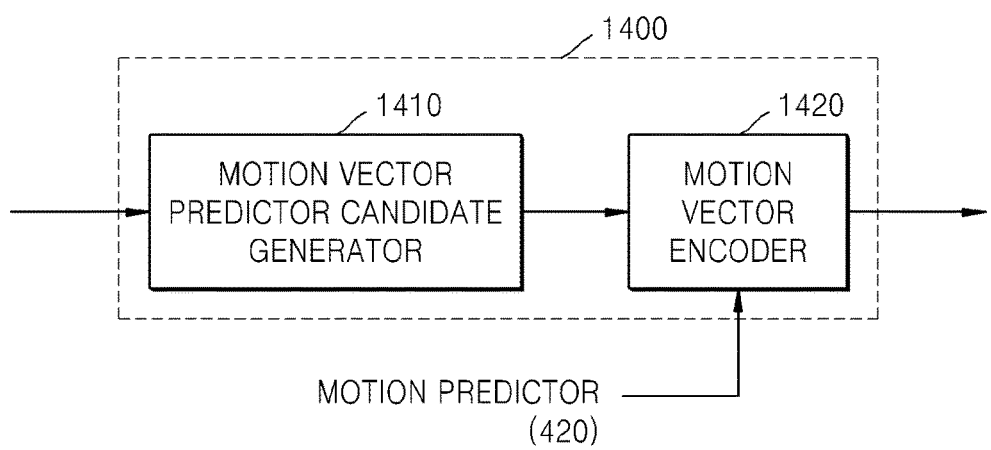
FIG. 14A is a block diagram illustrating a structure of a motion information encoding apparatus according to an embodiment of the present invention.

FIG. 14A is a block diagram illustrating a structure of a motion information encoding apparatus 1400 according to an embodiment of the present invention. Referring to FIG. 14A, the motion information encoding apparatus 1400 includes a motion vector predictor candidate generator 1410 and a motion vector encoder 1420. The motion information encoding apparatus 1400 of FIG. 14A may be included in the video encoder 400 of FIG. 4. For example, the motion predictor 420 of FIG. 4 may perform the function of the motion vector predictor candidate generator 1410 of FIG. 14A, and the entropy decoder 450 may perform the function of the motion vector encoder 1420 of FIG. 14A. However, the embodiments of the present invention are not limited thereto, and functions performed in the motion information encoding apparatus 1400 of FIG. 14A may also be performed using other components or a control unit (not shown) of the video decoder 400 of FIG. 4. The motion vector predictor candidate generator 1410 obtains a motion vector predictor candidate by using motion vectors of peripheral prediction units of a current prediction unit. In particular, the motion vector predictor candidate generator 1410 according to the current embodiment of the present invention always generates a fixed number n (n is an integer) of motion vector predictor candidates regardless of an external condition such as a position of a current prediction unit or motion information of peripheral prediction units. If the number of motion vectors included in a motion vector predictor candidate is smaller than a predetermined number n (n is an integer), the motion vector predictor candidate generator 1410 may modify default motion vector predictors of prediction units that are temporally related to or spatially related to a current prediction unit so that the number of vectors included in a motion vector predictor candidate is n, or may add an alternative motion vector predictor including a zero vector to a motion vector predictor candidate, thereby generating a total of n motion vector predictors. How a motion vector predictor candidate is generated will be described later.

The motion vector encoder 1420 determines a motion vector predictor of a motion vector with respect to a current prediction unit from among the n motion vector predictor candidates, and encodes index information indicating a motion vector predictor as motion vector information of the current prediction unit. In detail, the motion vector encoder 1420 may allocate a motion vector predictor index from 0 to (n−1) to each of the n motion vector predictor candidates, and may encode a motion vector predictor index corresponding to a motion vector predictor of the current prediction unit as motion vector information of the current prediction unit. For example, when n=2, that is, when the number of motion vector predictor candidates of a current prediction unit is fixed to two, and it is assumed that two motion vector predictor candidates generated using the motion vector predictor candidate generator 1410 in each of a L0 direction and a L1 direction are MVLX_Cand0 and MVLX_Cand1 (X is 0 or 1), the motion vector encoder 1420 sets a motion vector predictor index indicating MVLX_Cand0 as 0 and a motion vector predictor index indicating MVLX_Cand1 as 1, and encodes an index corresponding to a motion vector predictor having a smallest cost according to a result of encoding the current prediction unit, as motion vector information of the current prediction unit. As described above, when n=2, motion vector information of a current prediction unit may be encoded by using a motion vector predictor index of 1 bit.

In addition to the motion vector predictor index, the motion vector encoder 1420 encodes a difference between an original motion vector and a motion vector predictor of a current prediction unit, reference picture information, and prediction direction information, and adds the same to a bitstream.

As described above, when a fixed number of motion vector predictor candidates are obtained based on a predetermined rule at the encoder's side and index information indicating one of the motion vector predictor candidates is transmitted from the encoder's side, at the decoder's side, a fixed number of motion vector predictor candidates may be generated based on the same rule as for the encoder's side and a motion vector predictor of a current prediction unit may be determined using the transmitted index information. Also, at the decoder's side, a difference between an original motion vector and a motion vector predictor may be obtained from a bitstream, and a motion vector of a current prediction unit may be restored by adding the difference and the motion vector predictor indicated by a prediction motion vector index. Also, at the decoder's side, the restored motion vector and reference picture information and predictin direction information (L0 direction or L1 direction) obtained from the bit stream may be used to generate a prediction value of the current prediction unit.

Hereinafter, an operation of generating a motion vector predictor candidate in an AMVP will be described in detail.

Figure 15:
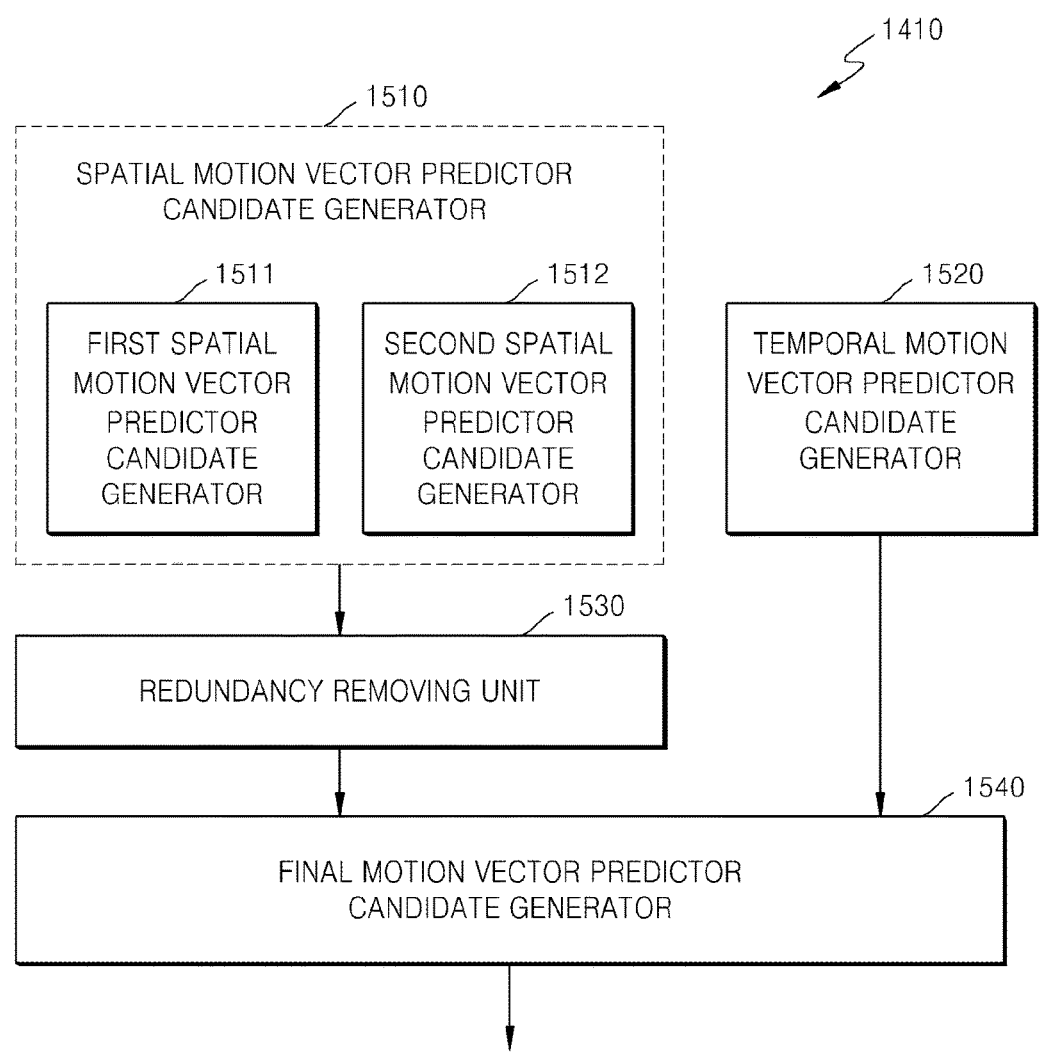
FIG. 15 is a block diagram illustrating a detailed structure of a motion vector predictor candidate generator of FIG. 14A according to an embodiment of the present invention.

FIG. 15 is a block diagram illustrating a detailed structure of the motion vector predictor candidate generator 1410 of FIG. 14A according to an embodiment of the present invention.

Referring to FIG. 15, the motion vector predictor candidate generator 1410 includes a spatial motion vector predictor candidate generator 1510, a temporal motion vector predictor candidate generator 1520, a redundancy removing unit 1530, and a final motion vector predictor candidate generator 1540.

The spatial motion vector predictor candidate generator 1510 generates a motion vector predictor candidate by using motion information of prediction units that are spatially related to a current prediction unit. In detail, the spatial motion vector predictor candidate generator 1510 includes a first spatial motion vector predictor generator 1511 that sequentially searches for peripheral prediction units located on the left of a current prediction unit in a predetermined order to obtain a first spatial motion vector predictor candidate and a second spatial motion vector predictor generator 1512 that sequentially searches for peripheral prediction units located above the current prediction unit in a predetermined order to obtain a second spatial motion vector predictor candidate.

Figure 16:
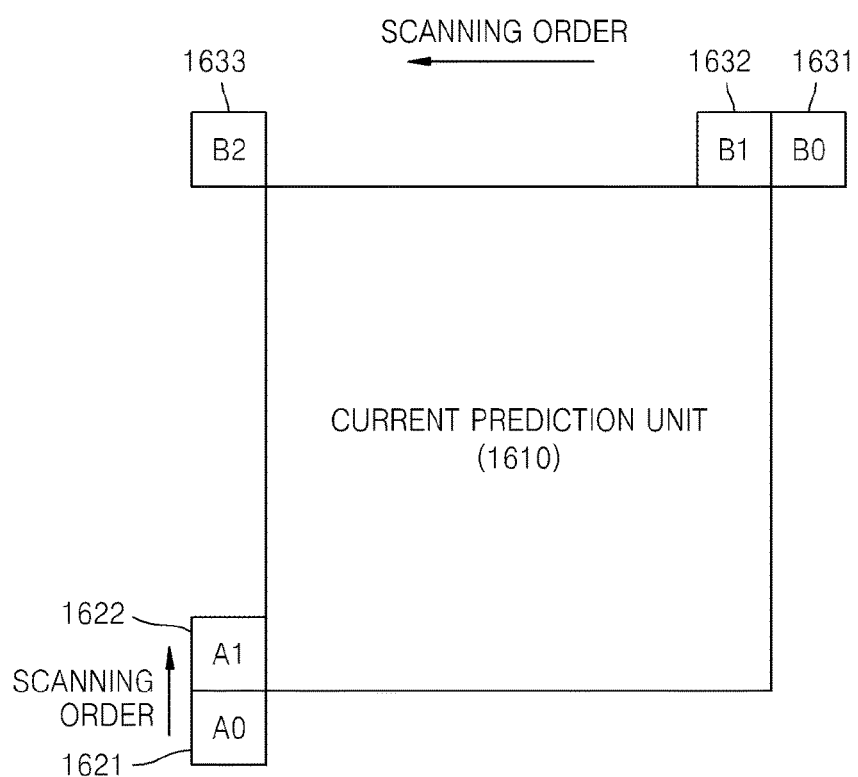
FIG. 16 illustrates peripheral prediction units used in obtaining a motion vector predictor of a current prediction unit, according to an embodiment of the present invention.

FIG. 16 illustrates peripheral prediction units used in obtaining a motion vector predictor of a current prediction unit 1610, according to an embodiment of the present invention.

Referring to FIG. 16, the spatial motion vector predictor candidate generator 1510 determines, as a first spatial motion vector predictor candidate, an available one from among motion vectors of a peripheral prediction unit A0 1621 located on a left down side of the current prediction unit 1610 and a peripheral prediction unit A1 1622 located on the upper side of the peripheral prediction unit A0 1621 located on the left down side, from among peripheral prediction units located on the left side of the current prediction unit 1610. Also, the spatial motion vector predictor candidate generator 1510 determines, as a second spatial motion vector predictor candidate, an available one from among motion vectors of a peripheral prediction unit B0 1631 located on the above right side of the current prediction unit 1610, a peripheral prediction unit B1 1632 located on the left side of the peripheral prediction unit B0 1631 located on the above right side, and a peripheral prediction unit B2 located on the above left side of the current prediction unit 1610, from among peripheral prediction units located on the upper side of the current prediction unit 1610.

In detail, the first spatial motion vector predictor candidate generator 1511 sequentially checks availability of a motion vector of the peripheral prediction units A0 1621 and A1 1622, and determines a motion vector of a peripheral prediction unit found to have an available motion vector, as a first spatial motion vector predictor candidate. Availability of a motion vector refers to whether a peripheral prediction unit has a motion vector indicating the same reference picture in the same reference picture list as a current prediction unit. For example, if a motion vector of the current prediction unit 1610 is a motion vector indicating a reference picture (L0R0 picture) having a R0 reference index in a L0 list, and the peripheral prediction unit A0 1621 is either an intra predicted prediction unit, has a motion vector indicating a reference picture included in a different reference picture list from the current prediction unit 1610 or has a motion vector indicating another reference picture of the same reference picture list, the peripheral prediction unit A0 1621 is determined as not having an available motion vector. If the peripheral prediction unit A1 1622 has a motion vector indicating the same reference picture in the same reference picture list as the current prediction unit 1610, the motion vector of the peripheral prediction unit A1 1622 is determined as a first spatial motion vector predictor candidate.

Similarly, the second spatial motion vector predictor candidate generator 1512 sequentially checks availability of motion vectors of the peripheral prediction unit B0 1631, the peripheral prediction unit B1 1632, and the peripheral prediction unit B2 1633, and determines a motion vector of a peripheral prediction unit that indicates the same reference picture in the same reference picture list as the current prediction unit 1610 as a second spatial motion vector predictor candidate.

If there is no peripheral prediction units having an available motion vector from among peripheral prediction units, a motion vector of a peripheral prediction unit indicating another reference picture of the same reference picture list or a motion vector of a peripheral prediction unit indicating a reference picture included in another reference picture list may be scaled and the scaled motion vector may be used as a motion vector predictor candidate of a current prediction unit.

Figure 17:
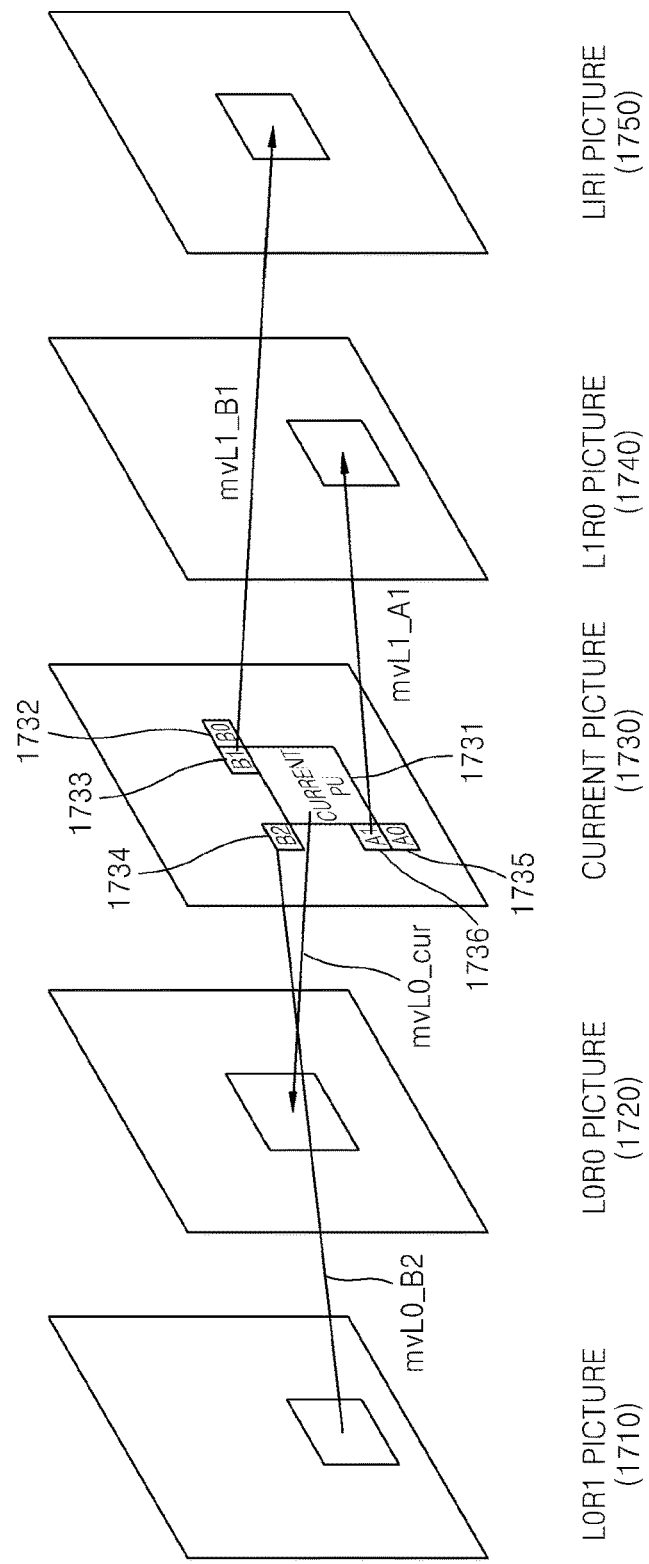
FIG. 17 is a reference diagram to explain an operation of determining a spatial motion vector predictor candidate that is scaled, according to an embodiment of the present invention.

FIG. 17 is a reference diagram to explain an operation of determining a spatial motion vector predictor candidate that is scaled, according to an embodiment of the present invention.

Referring to FIG. 17, a motion vector MVL0_Cur of a current prediction encoding unit 1730 indicates a L0R0 picture 1720 which is a reference picture having a R0 reference index in a L0 list; a peripheral prediction unit A0 1735 denotes an intra predicted prediction unit; a peripheral prediction unit A1 1736 has a motion vector mvL1_A1 indicating a a L1R0 picture 1740 which is a reference picture having a R0 reference index in a L1 list; a peripheral prediction unit B0 1732 denotes an intra predicted prediction unit; a peripheral prediction unit B1 1733 has a motion vector mvL1_B1 indicating a L1R1 picture 1750 which is a reference picture having a R1 reference index in the L1 list; and a peripheral prediction unit B2 1734 has a motion vector mvL0_B2 indicating a L0R1 picture 1710 which is a reference picture having a R1 reference index in the L0 list. In FIG. 17, any of the peripheral prediction units of the current prediction unit 1731 has a motion vector that has the L0R0 picture 1720 like the motion vector mvL0_Cur of the current prediction unit 1731.

As described above, if there is no peripheral prediction unit having a motion vector indicating the same reference picture as a reference picture indicated by a motion vector of the current prediction unit 1731, the spatial motion vector predictor candidate generator 1510 may scale a motion vector of an inter predicted prediction unit based on a temporal distance between a reference picture indicated by a motion vector of the inter predicted prediction unit from among peripheral prediction units and a reference picture indicated by a motion vector of a current prediction unit, and add the scaled motion vector to a motion vector predictor candidate. That is, the spatial motion vector predictor candidate generator 1510 may add, from among motion vectors of peripheral prediction units, a motion vector of a peripheral prediction unit indicating a reference picture having another reference index in the same reference picture list as the current prediction unit 1731, to a motion vector predictor candidate, or if there is any motion vector of a peripheral prediction unit indicating a reference picture having another reference index in the same reference picture list as the current prediction unit 1731, the spatial motion vector predictor candidate generator 1510 may add a motion vector of a peripheral prediction unit indicating a reference picture in another reference picture list that is different from the current prediction unit 1731.

For example, except the peripheral prediction unit A0 1735 which is intra predicted, the spatial motion vector predictor candidate generator 1510 may scale the motion vector mvL1_A1 of the peripheral prediction unit A1 1736 in consideration of a temporal distance between the current picture 1730 and the L0R0 picture 1720 indicated by the motion vector mvL0_Cur of the current prediction unit 1731 and a temporal distance between the current picture 1730 and the L1R0 picture 1740 indicated by the motion vector mvL1_A1 of the peripheral prediction unit A1 1736, and determine the scaled motion vector mvL1_A1' as a first spatial motion vector predictor candidate.

Also, instead of the motion vector mvL1_B1 of the peripheral prediction unit B1 1733 indicating the L1R1 picture 1750 which is a reference picture in another reference picture list, the spatial motion vector predictor candidate generator 1510 may scale, as a second spatial motion vector predictor candidate, the motion vector mvL0_B2 of the peripheral prediction unit B2 1734 indicating the L0R1 picture 1710 which is a reference picture having another reference index in the same reference picture list as the motion vector mvL0_Cur of the current prediction unit 1731 to determine the scaled motion vector as a second spatial motion vector predictor candidate. That is, when determining a motion vector of a peripheral prediction unit, which is to be scaled, the spatial motion vector predictor candidate generator 1510 may first determine a motion vector of a peripheral prediction unit indicating a reference picture included in the same reference picture list as a motion vector of a current prediction unit, and then, if there is no motion vector of a peripheral prediction unit indicating a reference picture included in the same reference picture list, the spatial motion vector predictor candidate generator 1510 may determine a motion vector of a peripheral prediction unit indicating a reference picture included in another reference picture list as a motion vector to be scaled. The spatial motion vector predictor candidate generator 1510 may scale the motion vector mvL0_B2 of the peripheral prediction unit B1 1734 in consideration of a temporal distance between the current picture 1730 and the L0R0 picture 1720 indicated by the motion vector mvL0_Cur of the current prediction unit 1731 and a temporal distance between the current picture 1730 and the L1R0 picture 1710 indicated by the motion vector mvL0_B2 of the peripheral prediction unit B2 1734, and determine the scaled motion vector mvL0_B2' as a second spatial motion vector predictor candidate.

Meanwhile, whether to include a scaled motion vector as described above in a spatial motion vector predictor candidate may be determined in consideration of a predetermined condition. For example, the spatial motion vector predictor candidate generator 1510 may scale a motion vector of an inter predicted prediction unit from among the peripheral prediction units B0 1732, B1 1733, and B2 1734 only when one of the peripheral prediction units 1735 A0 and 1736 A1, which are adjacent on the left side of the current prediction unit 1730, is intra predicted so as to include the scaled motion vector as a second spatial motion vector predictor candidate. In other words, whether to include a scaled motion vector in a spatial motion vector predictor candidate may be determined selectively according to whether a preset predetermined condition is satisfied or not. The predetermined condition is not limited to the condition described above and may be set in various manners.

Figure 18:
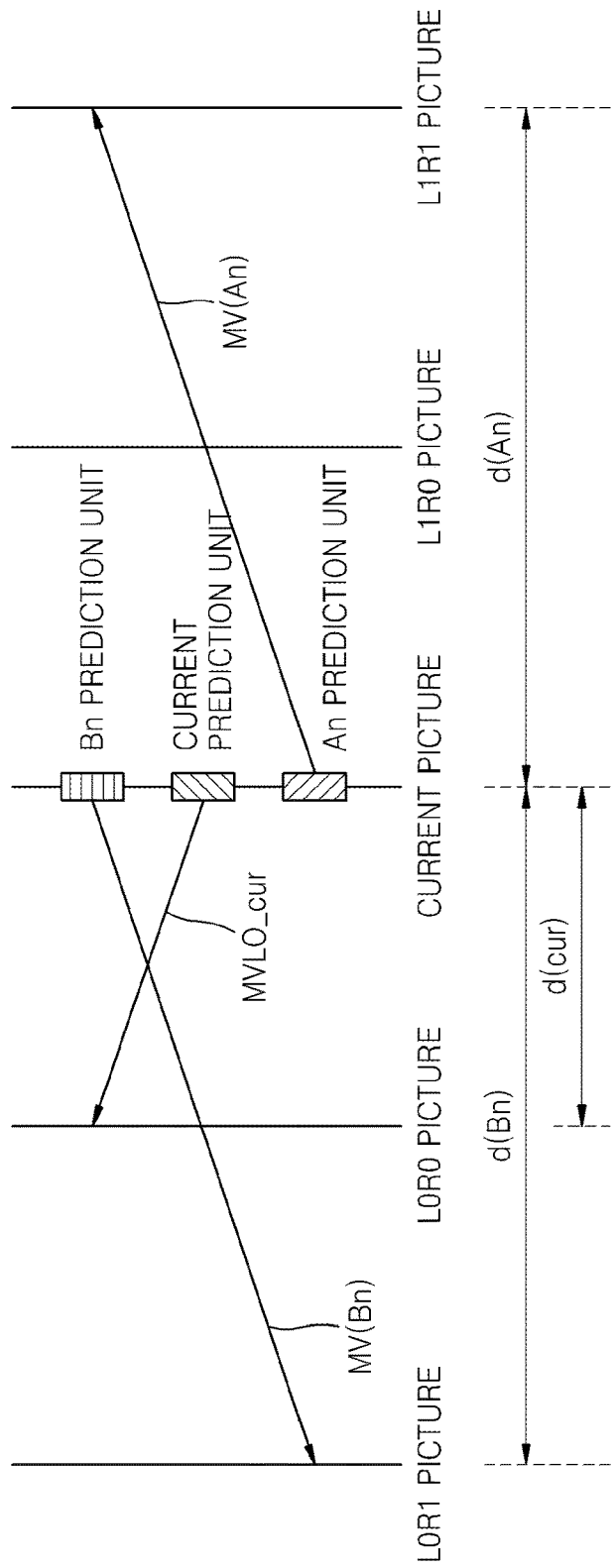
FIG. 18 is a reference diagram to explain a method of generating a motion vector predictor candidate of a current prediction unit by scaling a motion vector of a peripheral prediction unit, according to an embodiment of the present invention.

FIG. 18 is a reference diagram to explain a method of generating a motion vector predictor candidate of a current prediction unit by scaling a motion vector of a peripheral prediction unit, according to an embodiment of the present invention.

As described above, if there is no peripheral prediction unit that has a motion vector which is identical to a motion vector of a current prediction unit, that is, if there is no motion vector indicating a reference picture having the same reference index existing in the same reference picture, a motion vector MV (Bn) of a peripheral prediction unit (a Bn prediction unit of FIG. 18) that refers to another reference picture in the same reference picture list may be scaled, or a motion vector MV (An) of a peripheral prediction unit (an An prediction unit of FIG. 18) that refers to a reference picture in another reference picture list may be scaled, and the scaled motion vector may be added to a motion vector predictor candidate of the current prediction unit. In detail, when a temporal distance between a current picture and a reference picture (L0R0 picture) indicated by a motion vector MVL0_Cur is d(cur), and a temporal distance between the current picture and a reference picture (L0R1 picture) indicated by the motion vector MV(Bn) of the Bn prediction unit is d(Bn), the motion vector MV(Bn) of the Bn prediction unit may be scaled according to an equation as follows: MV(Bn)'=MV(Bn)*{d(cur)/d(Bn)}, and the scaled motion vector MV(Bn)' may be added to a motion vector predictor candidate of the current prediction unit. Similarly, when a temporal distance between a current picture and a reference picture (L1R1 picture) indicated by the motion vector MV(An) of the An prediction unit is d(An), the motion vector MV(An) of the An prediction unit may be scaled according to an equation as follows: MV(An)'=MV(An)*{d(cur)/d(An)}, and the scaled motion vector MV(An)' may be added to a motion vector predictor candidate of the current prediction unit.

Referring back to FIG. 15, the redundancy removing unit 1530 determines whether the first spatial motion vector predictor candidate and the second spatial motion vector predictor candidate are identical, and if the first and second motion vector predictor candidates are identical, the second motion vector predictor candidate that is redundant may be removed from a motion vector predictor candidate so as to include only the first spatial motion vector predictor in a motion vector predictor candidate; if the first and second spatial motion vector predictor candidates are not identical, both the first and second spatial motion vector predictor candidates are maintained in a motion vector predictor candidate.

The temporal motion vector predictor candidate generator 1520 may add, to a motion vector predictor candidate, a temporal motion vector predictor that is generated using a motion vector of a prediction unit that is temporally related to a current prediction unit, that is, a motion vector of a prediction unit that is related with respect to a position of the current prediction unit from among prediction units of a previous picture that are previously encoded.

Figure 19:
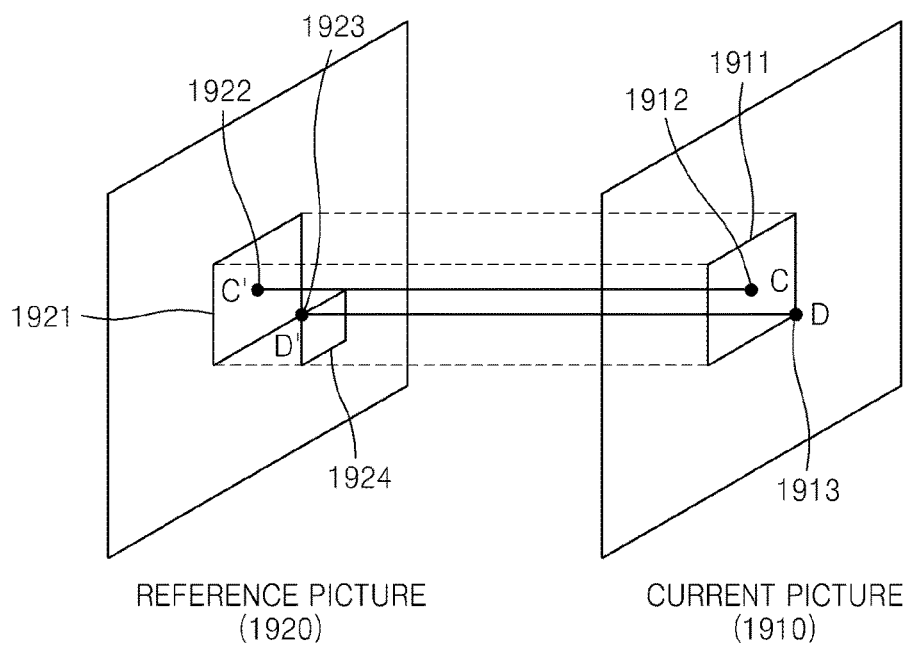
FIG. 19 is a reference diagram to explain an operation of generating a temporal motion vector predictor, according to an embodiment of the present invention.

FIG. 19 is a reference diagram to explain an operation of generating a temporal motion vector predictor, according to an embodiment of the present invention.

Referring to FIGS. 15 and 19, the temporal motion vector predictor candidate generator 1520 may generate a temporal motion vector predictor by scaling a motion vector of a prediction unit 1924 located on the right down side of a prediction unit 1921 of a reference picture 1920 at the same position as a current prediction unit 1911 from among prediction units of the reference picture 1920 that are encoded before the current picture 1910, and add the temporal motion vector predictor to a motion vector predictor candidate. An operation of scaling a temporal motion vector predictor may be performed based on a temporal distance between a reference picture indicated by a motion vector of the prediction unit 1924 located on the right down side and a reference picture indicated by a motion vector of a current prediction unit, as described above with reference to FIG. 18.

If the prediction unit 1924 located on the right down side is intra predicted and thus a motion vector thereof is not available, the temporal motion vector predictor candidate generator 1520 may generate a temporal motion vector predictor by scaling a motion vector of the prediction unit 1921 including a point C' 1922 of the reference picture 1920 at the same position as a point C 1911 of a center position of the current prediction unit 1911.

The number of motion vector predictors included in a prediction motion venctor candidate from which redundancy is removed using the redundancy removing unit 1530 may be less than the fixed number n. In the above example, if all peripheral prediction units located adjacent to the current prediction unit on the upper side or the left side are intra predicted, just less than n prediction vector candidates may be generated by the spatial motion vector predictor candidate generator 1510 and the temporal motion vector predictor candidate generator 1520.

If the number of motion vectors included in the motion vector predictor candidate from which redundancy is removed is less than the preset, fixed number n, the final motion vector predictor candidate generator 1540 may add a predetermined motion vector having a preset component value to the motion vector predictor candidate or add a motion vector predictor with a modified default motion vector predictor value, to a motion vector predictor candidate, until the number of motion vectors included in the motion vector predictor candidate reaches n. The predetermined motion vector may preferably be a zero vector with each of components having a value of 0. For example, when n=2, and a motion vector predictor candidate from which redundancy of temporal and spatial motion vector predictors is removed has only one motion vector predictor candidate, the final motion vector predictor generator 1540 add a zero vector (0,0) to the motion vector predictor candidate.

FIGS. 20A and 20B illustrate index information indicating a motion vector predictor of a current prediction unit according to an embodiment of the present invention. Referring to FIGS. 20A and 20B, an index AMVP_idx that is set for each motion vector predictor included in a motion vector predictor candidate in the case when n=2, that is, when there are two motion vector predictors to be included in a prediction motion venctor candidate is illustrated.

In FIG. 20A, an index set to a motion vector predictor candidate in a L0 direction as a motion vector predictor of a current prediction unit is illustrated, and in FIG. 20B, an index set to a motion vector predictor candidate in a L1 direction as a motion vector predictor of a current prediction unit is illustrated. As illustrated in FIGS. 20A and 20B, when n=2, a motion vector predictor index AMVP_idx from 0 to 1 is allocated to each of motion vector predictor candidates mvLX_Cand0 or mvLX_Cand1 (X is 0 or 1), and an index AMVP_idx allocated to a motion vector predictor of a current prediction unit is encoded as motion vector information of a current prediction unit.

The motion vector predictor index AMVP_idx may preferably be allocated such that a relatively small value is allocated as an index to a motion vector predictor obtained using motion vectors of prediction units that are temporally and spatially related to a current prediction unit, and a value next to the index allocated to temporal and spatial motion vector predictor candidates may preferably be allocated to an alternative motion vector predictor that is added so as to modify a default motion vector predictor candidate or that is added so that the number of total motion vector predictor candidates reaches n like a zero vector. Also, the motion vector predictor index AMVP_idx may be encoded using a truncated unary binarization method.

As described above, in an AMVP mode, a fixed number n of motion vector predictor candidates are generated, and a motion vector predictor index AMVP_idx from 0 to (n−1) is allocated to each of the n motion vector predictor candidates, and as motion vector information of a current prediction unit, a motion vector predictor index AMVP_idx indicating a motion vector predictor candidate used in prediction of a motion vector of a current prediction unit, a difference between a motion vector predictor and an original motion vector, reference picture information, and prediction direction information are encoded and transmitted to a decoder's end.

II. Encoding of Motion Information According to a Merge Mode

In a merge mode, motion information of a current prediction unit is encoded using motion information of prediction units included in merge candidates, and a flag (Merge flag) indicating whether (an encoding mode?) is a merge mode and an index (Merge index) indicating one of merge candidates that are to bring motion information are transmitted to a decoder's end.

Figure 14B:
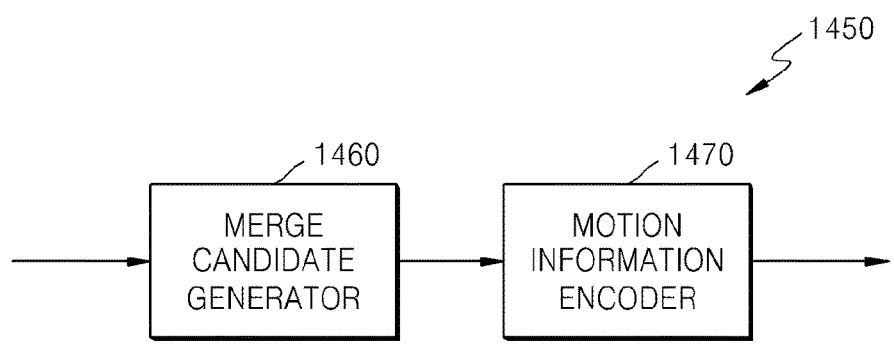
FIG. 14B is a block diagram illustrating a structure of a motion information encoding apparatus according to another embodiment of the present invention.

FIG. 14B is a block diagram illustrating a structure of a motion information encoding apparatus 1450 according to another embodiment of the present invention.

Referring to FIG. 14B, the motion information encoding apparatus 1450 includes a merge candidate generator 1460 and a motion information encoder 1470.

The merge candidate generator 1460 first searches for peripheral prediction units of a current prediction unit to generate merge candidates by using motion information of each of the peripheral prediction units. The found peripheral prediction units that are temporally and spatially related are similar to prediction units that are searched for in order to generate a motion vector predictor candidate in an AMVP mode described above. However, the merge mode is different from the AMVP mode in terms of an order of searching for spatially related peripheral prediction units. In detail, referring to FIGS. 14B and 16, the merge candidate generator 1460 searches for peripheral prediction units in an order of the peripheral prediction units A1 1622, B1 1632, B0 1631, A0 1621, and B2 1633 to check whether to include motion information of each of the peripheral prediction units in a merge candidate. The merge candidate generator 1460 searches for each prediction unit in the above order and removes a prediction unit included in another partition or remove a prediction unit having repeated motion information and generates a merge candidate by using motion information of the remaining prediction units. In particular, the merge candidate generator 1460 generates an always fixed numbr n (n is an integer) of merge candidates. If the number of motion information included in a merge candidate is smaller than the predetermined number n, the merge candidate generator 1460 adds an alternative merge candidate to a merge candidate so that the number of motion information included in the merge candidate reaches n. As will be described later, as the alternative merge candidate, motion information of a prediction unit used in generating a temporal motion vector predictor or motion information of a zero vector may be used.

The motion information encoder 1470 may determine a merge candidate to be used as motion information of a current prediction unit from among n merge candidates, and encodes an index (Merge index) indicating the determined merge candidate and a flag (Merge flag) indicating whether an encoding mode is a merge mode.

Figure 21A:
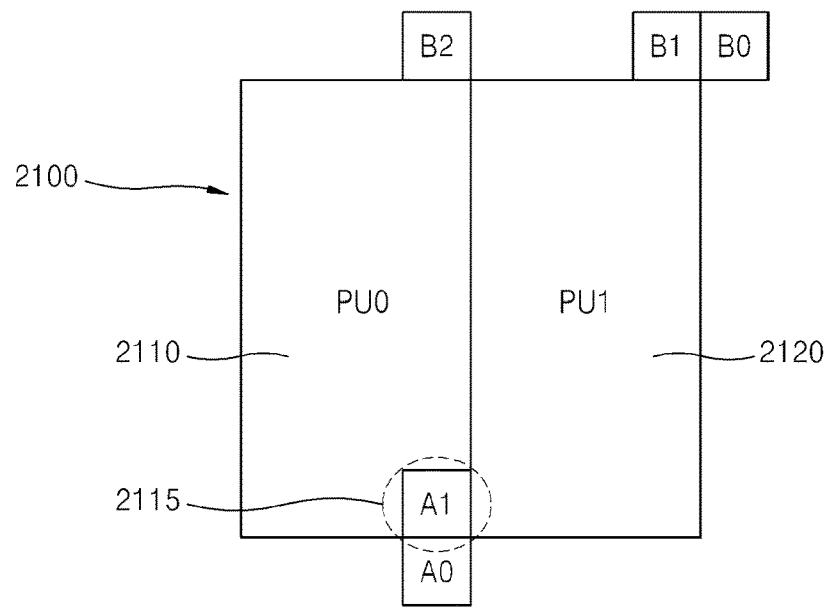
FIGS. 21A and 21B are reference diagrams to explain peripheral prediction units that are removed from a merge candidate, according to an embodiment of the present invention.
Figure 21B:
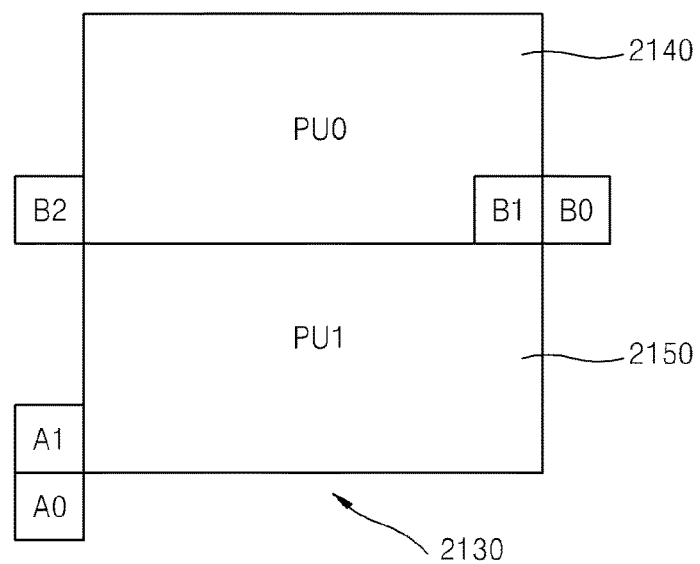

FIGS. 21A and 21B are reference diagrams to explain peripheral prediction units that are removed from a merge candidate, according to an embodiment of the present invention.

Referring to FIG. 21A, it is assumed that a prediction unit PU0 2110 and a prediction unit PU1 2120 are prediction units included in a coding unit 2100. As the prediction unit PU1 2120 is not a first prediction unit of the coding unit 2100, motion information of a peripheral prediction unit A1 2115 which is a prediction unit included in the prediction unit PU0 2110 is excluded from a merge candidate. The rest of peripheral prediction units B1, B0, A0, and B2 except the peripheral prediction unit A1 2115 are included in the mege candidate. Those of the peripheral prediction units B1, B0, A0, and B2 not having motion information are excluded from the merge candidate.

Similarly, referring to FIG. 21B, it is assumed that a prediction unit PU0 2140 and a prediction unit PU1 2150 are prediction units included in a coding unit 2130. As the prediction unit PU 2150 is not a first prediction unit of the coding unit 2130, when generating a merge candidate of the prediction unit PU1 2150, motion information of a peripheral prediction unit B1 which is a prediction unit included in the prediction unit PU 2140 is excluded from a mege candidate, and motion information of the rest of peripheral prediction units A1, B0, A0, and B2 are included in the merge candidate.

The merge candidate generator 1460 generates a merge candidate based on availability of motion information of the peripheral prediction units A1, B1, B0, A0, and B2 or whether the peripheral prediction units A1, B1, B0, A0, and B2 are included in another partition, with respect to a current prediction unit, and then removes redundancy of motion information existing in the merge candidate.

Figure 22:
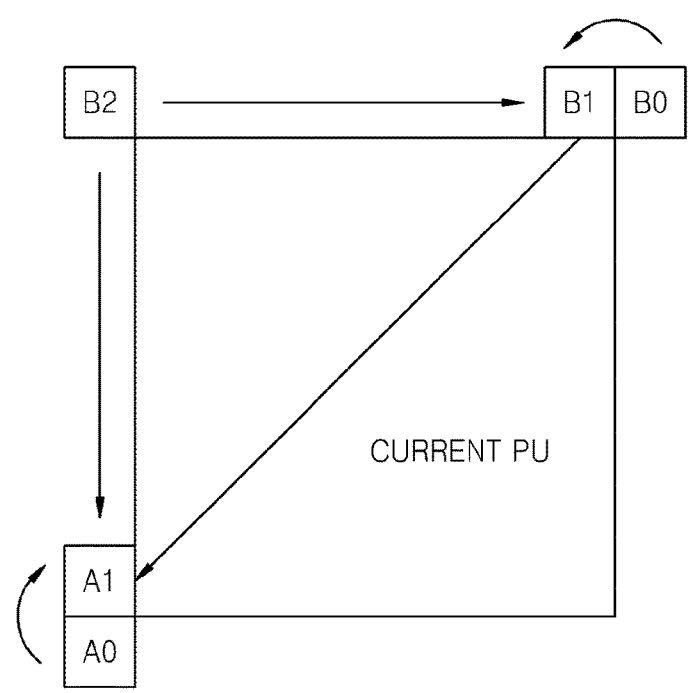
FIG. 22 is a reference diagram to explain an operation of removing redundancy of motion information included in a merge candidate, according to an embodiment of the present invention.

FIG. 22 is a reference diagram to explain an operation of removing redundancy of motion information included in a merge candidate, according to an embodiment of the present invention.

Referring to FIGS. 16 and 22, if motion information of a prediction unit A1 which is first found is included in a merge candidate, the merge candidate generator 1460 maintains motion information of the prediction unit A1 in the merge candidate. The merge candidate generator 1460 checks redundancy of motion information in an arrow direction illustrated in FIG. 22. For example, if motion information of the prediction unit B1 and motion information of the prediction unit A1 are compared to be found as repeated, the merge candidate generator 1460 removes motion information of the prediction unit B1 from the merge candidate. Also, the merge candidate generator 1460 compares motion information of the prediction unit B1 and motion information of the prediction unit A1, and if the two motion information are repeated, the merge candidate generator 1460 removes the motion information of the prediction unit B1 from the merge candidate. Similarly, when the prediction unit B0 includes the same motion information as that of the prediction unit B1 , the merge candidate generator 1460 removes the motion information of the prediction unit B0 from the merge candidate; when the prediction unit A0 includes the same motion information as that of the prediction unit A1, the merge candidate generator 1460 removes the motion information of the prediction unit A0 from the merge candidate; and when the prediction unit B2 includes the same motion information as that of one of the prediction unit B1 and the prediction unit A1, the merge candidate generator 1460 removes the motion information of the prediction unit B2 from the merge candidate, thereby removing redundancy of motion information existing in the merge candidate.

Also, as illustrated in FIG. 19 which is described above, the merge candidate generator 1460 may include motion information of the prediction units 1921 and 1924 used in generating a temporal motion vector predictor candidate, in an AMVP mode, in the merge candidate.

If the number of merge candidates that include motion information of a peripheral prediction unit or motion information of a prediction unit used in generating a temporal motion vector predictor candidate exceeds a fixed number n, the merge candidate generator 1460 may select n merge candidates from firstly generated merge candidates. The merge candidate generator 1460 may add an alternative merge candidate to a merge candidate if the number of merge candidates is less than the fixed number n.

Figure 23:
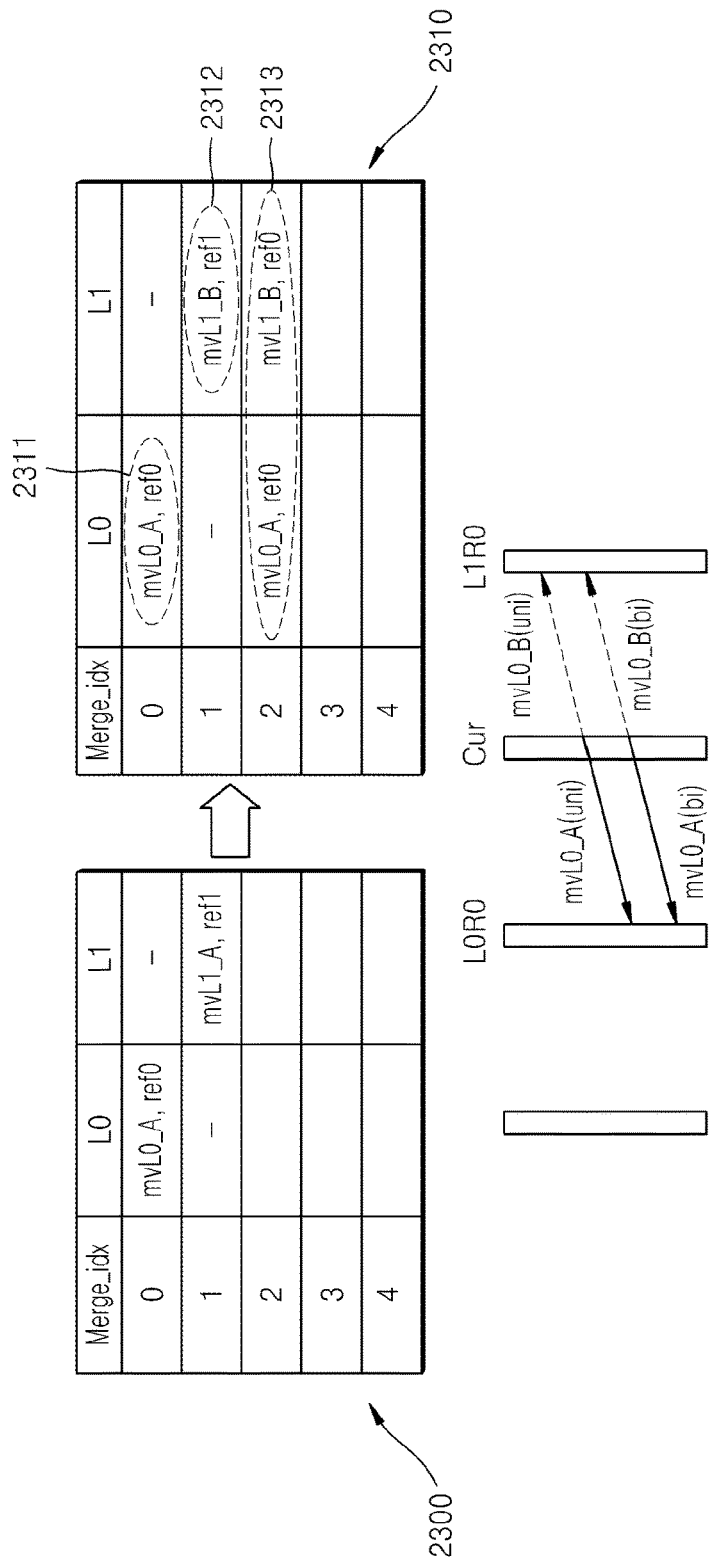
Figure 24:
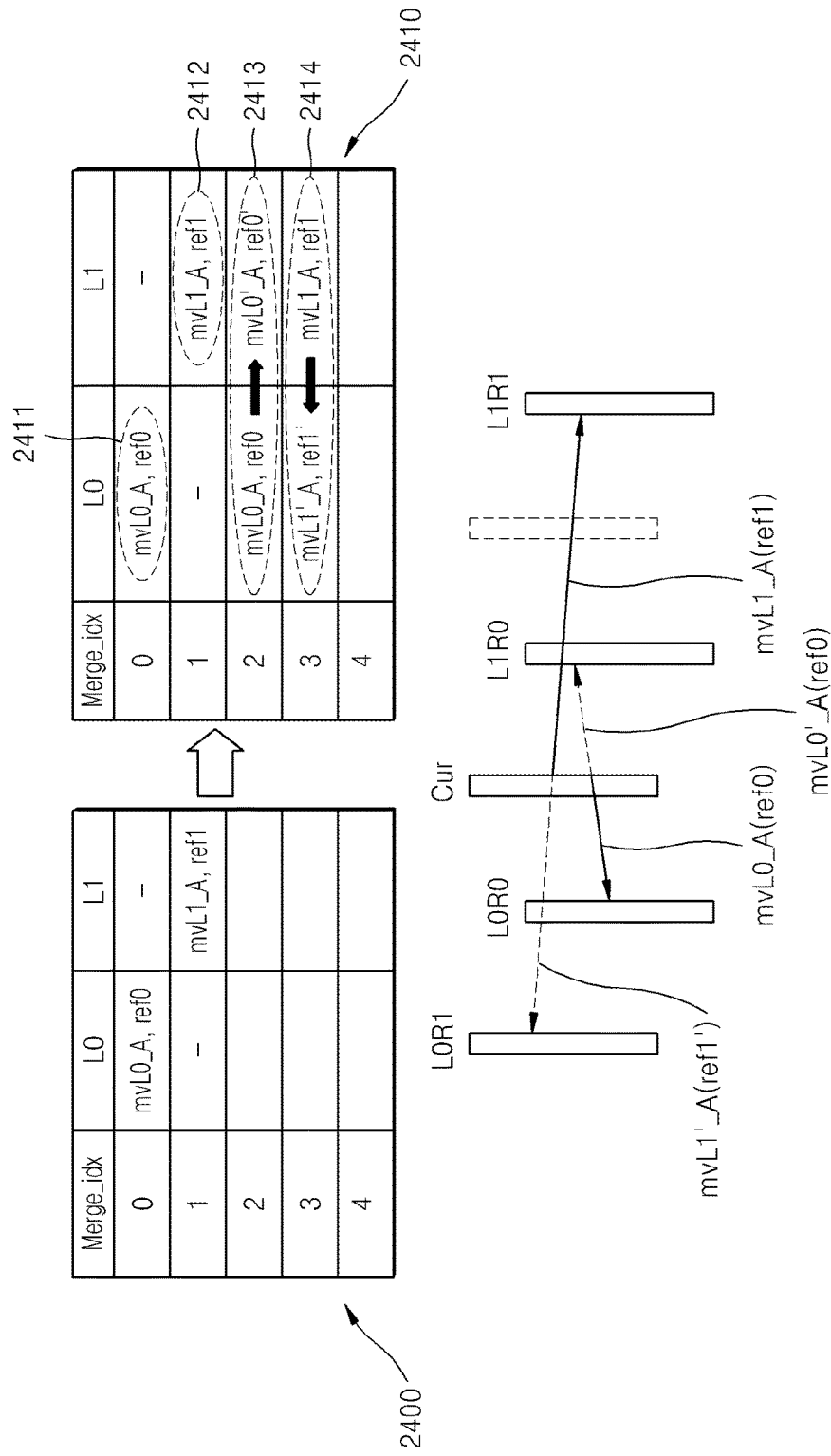

FIGS. 23 through 25 are reference diagrams to explain an operation of adding an alternative merge candidate to a merge candidate, according to an embodiment of the present invention.

Referring to FIG. 23, it is assumed that an original merge candidate (2300) generated using, for example, motion information of a peripheral prediction unit or motion information of a prediction unit used in determining a temporal motion vector predictor is as shown by a table 2300. For encoding of motion information of a bidirectionally predicted prediction unit of a B slice, the merge candidate generator 1460 may combine motion information 2311 and 2312 included in the original merge candidate 2300 to add motion information 2313 regarding bidirectional prediction, to the original merge candidate 2300, thereby generating an updated merge candidate 2310. If a current prediction unit is bidirectionally predicted using a reference picture having a reference index ref0 in a reference picture list (list0) and a reference picture having a reference index ref0 in a reference picture list (list1), an index Merge_idx=3 may be encoded as motion information of the current prediction unit. At a decoder's side, a merge candidate is generated and updated in the same manner as at an encoder's side, and then motion information of the current prediction unit may be determined using a merge index included in a bitstream, and a prediction value of the current prediction unit may be generated using the determined motion information.

Referring to FIG. 24, it is assumed that an original merge candidate (2400) generated using, for example, motion information of a peripheral prediction unit or motion information of a prediction unit used in determining a temporal motion vector predictor is as shown by a table 2400. For encoding of motion information of a bidirectionally predicted prediction unit of a B slice, the merge candidate generator 1460 may scale motion information 2411 and 2412 included in an original merge candidate and add motion information 2413 and 2414 regarding bidirectional prediction generated by the scaling, to the original merge candidate 2400, thereby generating an updated merge candidate 2410. For example, the merge candidate generator 1460 may scale a motion vector mvL0_A included in the motion information 2411 corresponding to an index Merge_idx=0 to generate the motion information 2413 indicating a reference picture L1R1 having the same reference index as that included in another reference picture list.

Referring to FIG. 25, it is assumed that an original merge candidate (2500) generated using, for example, motion information of a peripheral prediction unit or motion information of a prediction unit used in determining a temporal motion vector predictor is as shown by a table 2500. For encoding of motion information of a bidirectionally predicted prediction unit of a B slice, the merge candidate generator 1460 maintains reference picture information of motion information included in the original merge candidate (2500) but newly adds motion information 2511 and 2512 having a zero vector to the original merge candidate 2500, thereby generating an updated merge candidate 2510.

As described above, the merge candidate generator 1460 may combine motion information included in an original merge candidate, scale a motion vector, or add motion information having a zero vector to the original merge candidate, so that n motion information are included in a merge candidate.

When a merge candidate including n motion information is generated as described above, the motion information encoder 1470 sets a merge index from 0 to (n−1) for each of the n motion information, and encodes a merge index indicating motion information used in encoding of a current prediction unit and a flag (merge flag) indicating whether to apply a merge mode, as motion information of the current prediction unit.

Figure 26:
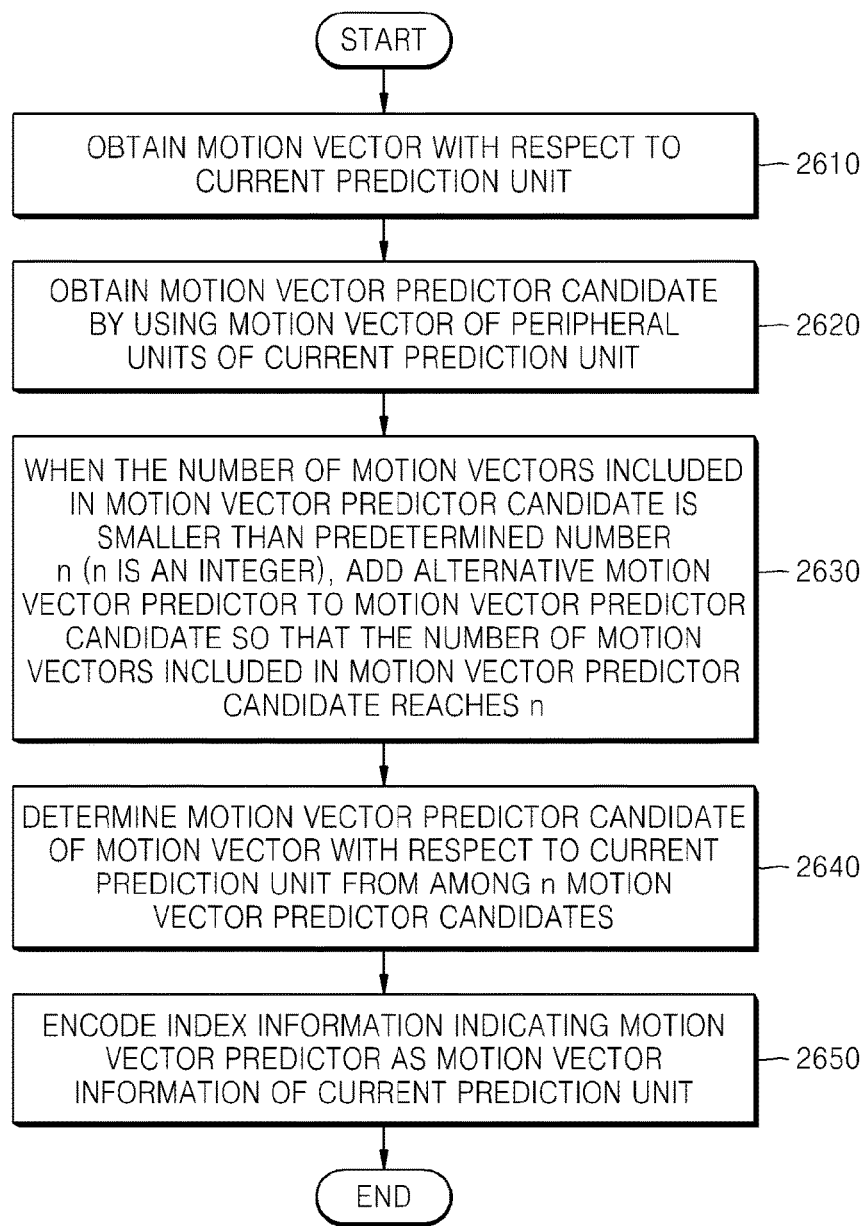
FIG. 26 is a flowchart of a method of encoding motion information, according to an embodiment of the present invention.

FIG. 26 is a flowchart of a method of encoding motion information, according to an embodiment of the present invention.

Referring to FIG. 26, in operation 2610, the motion predictor 420 obtains a motion vector of a current prediction unit by performing motion prediction on the current prediction unit.

In operation 2620, the motion vector predictor candidate generator 1410 obtains a motion vector predictor candidate by using motion vectors of prediction units that are temporally related to the current prediction unit and prediction units that are spatially related to the current prediction unit. As illustrated in FIG. 16 described above, the motion vector predictor candidate generator 1410 checks availability of motion vectors of the peripheral prediction units A0 and A1 adjacent on the left side and motion vectors of the peripheral prediction units B0, B1, and B2 adjacent on the upper side and include motion vectors of available peripheral prediction units in a motion vector predictor candidate. As described above, if there is no available motion vector of a peripheral prediction unit, a motion vector obtained by scaling a motion vector of an inter predicted peripheral prediction unit may be included in a motion vector predictor candidate.

In operation 2630, when the number of motion information included in the motion vector predictor candidate is smaller than a predetermined number n (n is an integer), the motion vector predictor candidate generator 1410 adds an alternative motion vector predictor to the motion vector predictor candidate so that the number of motion vectors included in the motion vector predictor candidate reaches n. As described above, a motion vector obtained by modifying a default motion vector predictor or a zero vector may be used as the alternative motion vector predictor.

In operation 2640, the motion vector encoder 1420 determines a motion vector predictor of a motion vector with respect to a current prediction unit, from among the n motion vector predictor candidates. In operation S2650, the motion vector encoder 1420 encodes index information AMVP_idx indicating a motion vector predictor as motion vector information of the current prediction unit. In addition, besides the index information AMVP_idx indicating a motion vector predictor, a difference between a motion vector predictor and an actual motion vector of the current prediction unit, reference picture information, and prediction information are transmitted.

Meanwhile, the prediction motion candidate generator 1410 of the motion information encoder 1400 of FIG. 14 As may reduce a redundancy check when including the alternative motion vector predictor in a candidate group, in order to reduce complexity of checking operation.

Also, while an example in which a preset fixed number n of motion vector predictor candidates are used at the encoder's end and the decoder's end is assumed in the embodiments of the present invention described above, the embodiments of the present invention are not limited thereto, and the number of motion vector predictor candidates may be added to a sequence parameter set (SPS), a picture parameter set (PPS), or a slice header to be transmitted. Also, the number of motion vector predictor candidates may be adaptively determined based on the number A of prediction units that are inter predicted to have a motion vector, from among peripheral prediction units previously processed before a current prediction unit or a smaller value from among the number A and a preset fixed number n may be set as the number of motion vector predictor candidates.

III. Decoding of Motion Information in an AMVP Mode

As described above, when motion information of a current prediction unit is encoded in an AMVP mode, a flag (Merge flag) indicating whether a mode applied to the current prediction unit is a merge mode is set as 0. At a decoder's end, if the flag (Merge flag) indicating whether a mode applied to the current prediction unit is a merge mode is set as 0, it is determined that motion information of the current prediction unit is encoded in an AMVP mode, and a motion vector predictor index AMVP_idx of the current prediction unit, a difference between a motion vector predictor and an original motion vector, reference picture information, and prediction direction information are obtained from a bitstream.

Figure 27A:
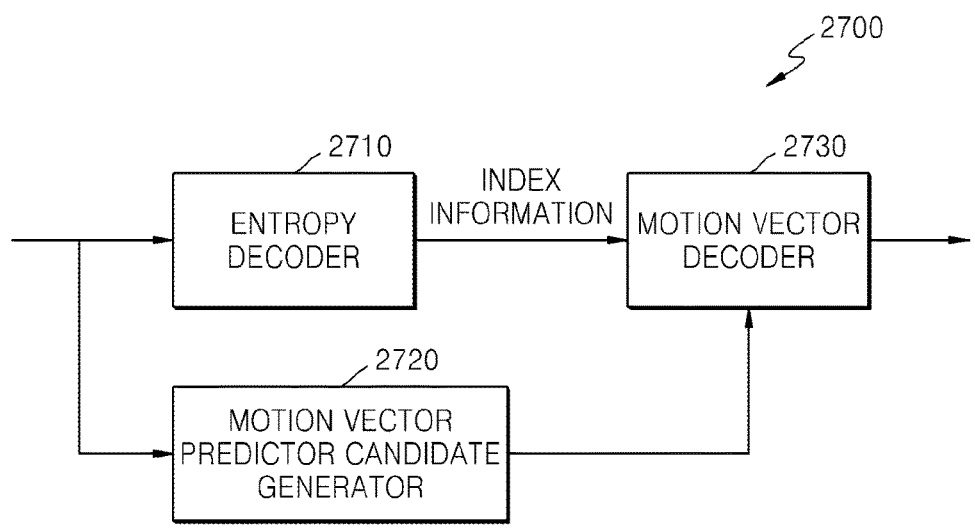
FIG. 27A is a block diagram illustrating a structure of a motion information decoding apparatus according to an embodiment of the present invention.

FIG. 27A is a block diagram illustrating a structure of a motion information decoding apparatus 2700 according to an embodiment of the present invention.

Referring to FIG. 27A, the motion vector decoding apparatus 2700 includes an entropy decoder 2710, a motion vector predictor candidate generator 2720, and a motion vector decoder 2730.

The entropy decoder 2710 obtains, from a bitstream, a motion vector predictor index AMVP_idx of a current prediction unit, a difference between a motion vector predictor and an original motion vector, reference picture information, and prediction direction information.

Like the motion vector predictor candidate generator 1410 of FIG. 14A described above, the motion vector predictor candidate generator 2720 obtains a motion vector predictor candidate by using motion vectors of peripheral prediction units of a current prediction unit, and if the number of motion vectors included in a motion vector predictor is less than a predetermined number n (n is an integer), the motion vector predictor candidate generator 2720 adds an alternative motion vector predictor to the motion vector predictor candidate so that the number of motion vectors included in the motion vector predictor candidate is n.

The motion vector decoder 2730 uses a motion vector predictor index (AMVP_idx) of a current prediction unit, obtained from a bitstream, to obtain one motion vector predictor from among motion vector predictor candidates generated using the motion vector predictor candidate generator 2720. Also, the motion vector decoder 2730 restores a motion vector of the current prediction unit by adding a difference between the motion vector predictor obtained from the bitstream and an original motion vector, to the motion vector predictor.

IV. Decoding of Motion Information in a Merge Mode

When motion information of a current prediction unit is encoded in a merge mode in which motion information of a peripheral prediction unit is used as motion information of the current prediction unit, as described above, a flag (Merge flag) indicating whether a mode applied to the current prediction unit is a merge mode is set as 1 at an encoder's end, and the flag (Merge flag) indicating whether a mode applied to the current prediction unit is a merge mode and an index (Merge index) indicating one of merge candidates that are to bring motion information are transmitted to a decoder's end. At the decoder's end, if the flag (Merge flag) indicating whether a mode applied to the current prediction unit is a merge mode is set as 1, it is determined that motion information of the current prediction unit is encoded in a merge mode, and an index (Merge index) indicating one of merge candidates that are to bring motion information from a bitstream is obtained, and motion information of a merge candidate determined using the Merge index, that is, motion vectors of peripheral prediction units, reference picture information, and prediction direction information are used as motion information of the current prediction unit.

Figure 27B:
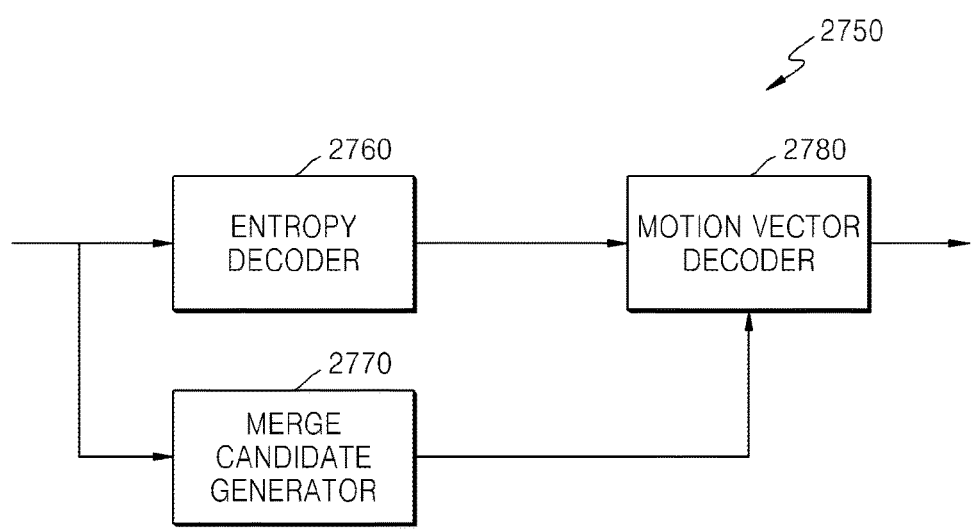
FIG. 27B is a block diagram illustrating a structure of a motion information decoding apparatus according to another embodiment of the present invention.

FIG. 27B is a block diagram illustrating a structure of a motion information decoding apparatus 2750 according to another embodiment of the present invention.

Referring to FIG. 27B, the motion information decoding apparatus 2750 includes an entropy decoder 2760, a merge candidate generator 2770, and a motion vector decoder 2780.

The entropy decoder 2760 obtains, from a bitstream, a flag (Merge flag) indicating whether a mode applied to the current prediction unit corresponds to a merge mode and an index (Merge index) indicating one of merge candidates that are to bring motion information.

Like the merge candidate generator 1460 of FIG. 14B described above, the motion vector predictor candidate generator 2720 searches for peripheral prediction units of a current prediction unit to combine motion information of each of the peripheral prediction units, motion information of a prediction unit used in determining a temporal motion vector predictor, and motion information included in an original merge candidate, to scale a motion vector, or to add motion information having a zero vector, thereby generating a merge candidate including n motion information.

When a merge candidate including n motion information is generated, the motion information decoder 2780 sets motion information of the current prediction unit by using the motion information of a merge candidate indicated by the index (Merge index) indicating one of merge candidates obtained from the bitstream. In a merge mode, unlike an AMVP mode, a motion vector included in the merge candidate is used as motion vector of the current prediction unit without any change.

Figure 28:
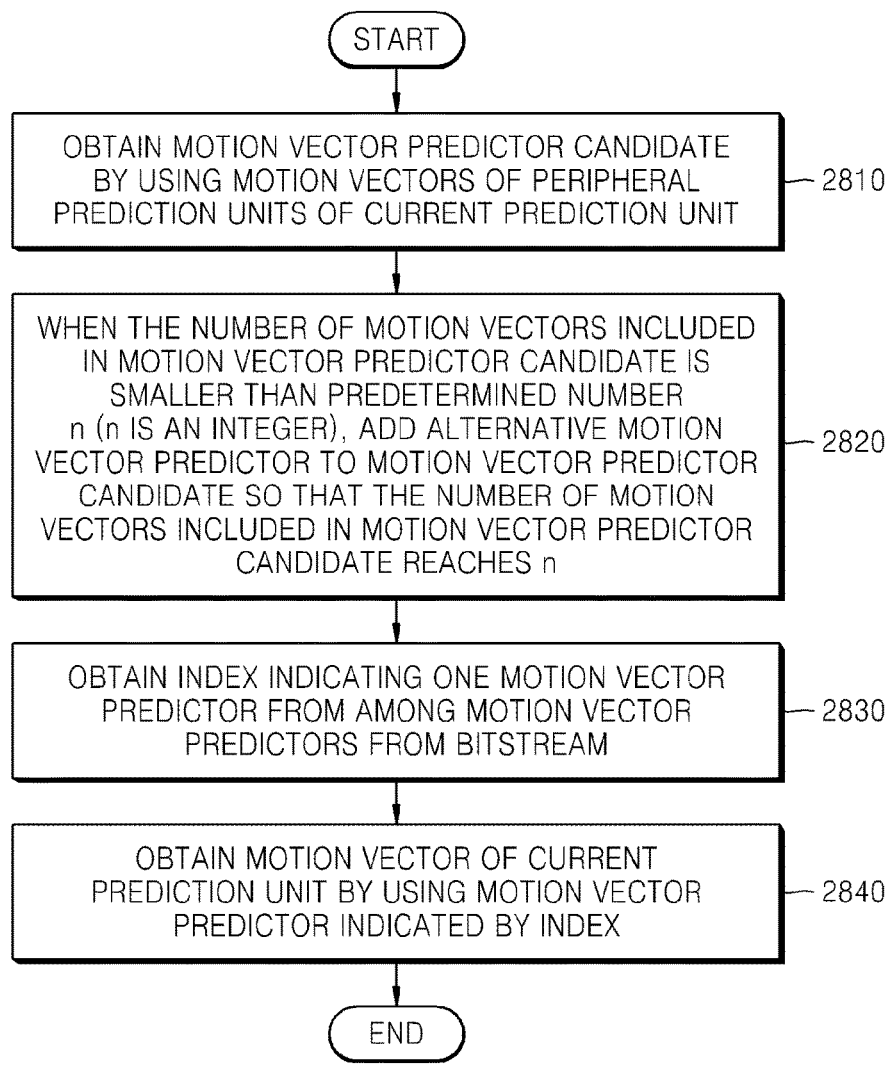
FIG. 28 is a flowchart of a method of decoding a motion vector, according to an embodiment of the present invention.

FIG. 28 is a flowchart of a method of decoding a motion vector, according to an embodiment of the present invention.

Referring to FIG. 28, in operation 2810, the motion vector predictor candidate generator 2720 obtains a motion vector predictor candidate by using motion vectors of prediction units that are temporally related to a current prediction unit and motion vectors of prediction units that are spatially related to the current prediction unit. As described above, the motion vector predictor candidate generator 2720 generates a motion vector predictor candidate in the same manner as the motion vector predictor candidate generator 1410 of FIG. 14A.

In operation 2820, if the number of motion vectors included in a motion vector predictor candidate is smaller than a predetermined number n (n is an integer), the motion vector predictor candidate generator 2720 adds an alternative motion vector to the motion vector predictor candidate so that the number of motion vectors included in the motion vector predictor candidate is the predetermined number n. As described above, a preset, fixed number n of motion vector predictor candidates are generated so that independent processing is possible without any peripheral information without modifying an index (AMVP_idx) indicating a motion vector predictor candidate.

In operation 2830, the entropy encoder 2710 obtains an index indicating a motion vector predictor applied to a current prediction unit from among motion vector predictor candidates from a bitstream.

In operation 2840, the motion vector decoder 2730 restores a motion vector of a current prediction unit by using a motion vector predictor indicated by the obtained index. In detail, the motion vector decoder 2730 restores a motion vector of a current prediction unit by adding a motion vector predictor that is determined by using the index AMVP_idx indicating the motion vector predictor included in a bitstream and a difference between a motion vector predictor included in the bitstream and an original motion vector. As described above, in an AMVP mode, reference picture information and prediction direction information are further included in the bitstream in addition to information about the motion vector as described above. In a merge mode, motion information included in a merge candidate is used in restoring motion information of a current prediction unit without any change.

The invention may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method of decoding a motion vector, the method comprising:
   obtaining a flag indicating whether a prediction mode of a current prediction unit is a merge mode which uses a motion vector included in merge motion vector candidates;
   when the flag indicates that the prediction mode of the current prediction unit is the merge mode, obtaining merge motion vector candidates by using motion vectors of a temporally neighboring prediction unit that is temporally related to the current prediction unit and motion vectors of spatially neighboring prediction units that are spatially related to the current prediction unit;
   when a number of motion vectors included in the obtained merge motion vector candidates is smaller than n−1, wherein n is a predetermined integer number, adding a plurality of zero vectors to the obtained merge motion vector candidates so that the number of motion vectors included in the merge motion vector candidates reaches the n;
   obtaining an index indicating a motion vector from among the n motion vectors included in the merge motion vector candidates from a bitstream; and
   obtaining a motion vector of the current prediction unit by using the motion vector indicated by the obtained index,
   wherein the predetermined integer number n is determined based on information regarding the predetermined integer number n, the information being included in at least one of a sequence parameter set (SPS), a picture parameter set (PPS), and a slice header.

* * * * *